US012712261B2

(12) United States Patent
Hara et al.

(10) Patent No.: US 12,712,261 B2
(45) Date of Patent: Aug. 18, 2026

(54) ANTENNA DEVICE

(71) Applicant: YOKOWO CO., LTD., Tokyo (JP)

(72) Inventors: Bunpei Hara, Gunma (JP); Yusuke Yokota, Gunma (JP); Kazuki Yamada, Gunma (JP)

(73) Assignee: YOKOWO CO., LTD., Tokyo (JP)

( * ) Notice: Subject to any disclaimer, the term of this patent is extended or adjusted under 35 U.S.C. 154(b) by 40 days.

(21) Appl. No.: 18/852,143

(22) PCT Filed: Mar. 31, 2023

(86) PCT No.: PCT/JP2023/013668
§ 371 (c)(1),
(2) Date: Sep. 27, 2024

(87) PCT Pub. No.: WO2023/191085
PCT Pub. Date: Oct. 5, 2023

(65) Prior Publication Data

US 2025/0210856 A1 Jun. 26, 2025

(30) Foreign Application Priority Data

Mar. 31, 2022 (JP) ................................ 2022-058893

(51) Int. Cl.

| | |
|---|---|
| ***H01Q 1/32*** | (2006.01) |
| ***H01Q 1/42*** | (2006.01) |
| ***H01Q 1/52*** | (2006.01) |
| ***H01Q 9/04*** | (2006.01) |

(52) U.S. Cl.
CPC ............ *H01Q 1/42* (2013.01); *H01Q 1/3275* (2013.01); *H01Q 1/528* (2013.01); *H01Q 9/0407* (2013.01)

(58) Field of Classification Search
CPC .......... H01Q 1/32; H01Q 1/3275; H01Q 1/42; H01Q 1/528; H01Q 9/0407; H01Q 19/32
See application file for complete search history.

(56) References Cited

U.S. PATENT DOCUMENTS

| | | | | |
|---|---|---|---|---|
| 2020/0067180 | A1* | 2/2020 | Mizuno .................... | H01Q 9/42 |
| 2021/0083371 | A1 | 3/2021 | Koide | |
| 2023/0335890 | A1* | 10/2023 | Yokota ................. | H01Q 1/3275 |
| 2024/0047897 | A1* | 2/2024 | Hara ........................ | H01Q 1/32 |

FOREIGN PATENT DOCUMENTS

| | | | |
|---|---|---|---|
| JP | 2009-246809 | A | 10/2009 |
| JP | 2019-216342 | A | 12/2019 |
| WO | WO 2021/195306 | A1 | 9/2021 |

* cited by examiner

*Primary Examiner* — Daniel Munoz
(74) *Attorney, Agent, or Firm* — Paratus Law Group, PLLC

(57) ABSTRACT

An antenna device includes: an antenna housing in which a hollow portion is formed; an antenna located inside the antenna housing and configured to perform at least one of transmission and reception of electric waves; and a scatterer configured to scatter the electric waves propagating through the hollow portion at a predetermined position of the antenna housing.

9 Claims, 14 Drawing Sheets

ANTENNA DEVICE

CROSS REFERENCE TO PRIOR APPLICATION

This application is a National Stage Patent Application of PCT International Patent Application No. PCT/JP2023/013668 (filed on Mar. 31, 2023) under 35 U.S.C. § 371, which claims priority to Japanese Patent Application No. 2022-058893 (filed on Mar. 31, 2022), which are all hereby incorporated by reference in their entirety.

TECHNICAL FIELD

The present invention relates to an antenna device that can be mounted on a movable body, such as a vehicle or a robot.

BACKGROUND ART

Applications using vehicle-to-everything (V2X) communication have been developed in response to a recent increase in demand for in-vehicle applications. V2X communication is a generic term for vehicle-to-infrastructure (V2I) communication, vehicle-to-vehicle (V2V) communication, vehicle-to-pedestrian (V2P) communication, vehicle-to-device (V2D) communication, and vehicle-to-grid (V2G) communication. In V2X communication, when two V2X-compatible communication devices enter the communication range of an antenna of each other, an ad hoc network including the vehicles equipped with the communication devices and the antennas is formed.

Patent Literature 1 discloses an in-vehicle wireless system that enables V2X communication in a vehicle. The in-vehicle wireless system includes, for example, an on-roof antenna housing attached to the roof of the vehicle and an in-cabin antenna housing disposed in the cabin. The on-roof antenna housing has a hollow portion. The hollow portion accommodates an antenna for V2X and an antenna for Global Navigation Satellite System (GNSS). The in-cabin antenna housing accommodates a telephone antenna capable of communicating with a smartphone or the like that executes an application. The antenna mounted on the vehicle is ideally isotropic because the position of a communication partner of the antenna device mounted on the vehicle is often indefinite.

CITATION LIST

Patent Literature

Patent Literature 1: JP2019-216342A

SUMMARY OF INVENTION

Technical Problem

The on-roof antenna housing described in Patent Literature 1 is molded of a resin material. A resin material is well known to transmit electric waves, but in reality, electric waves propagate through various paths in the hollow portion of the antenna housing. Therefore, even if the antenna is isotropic, a phenomenon called ripple occurs in which the directional characteristics are disturbed. The ripple often has the maximum value in a region adjacent to a region where the ripple has the minimum value. The communication with the communication partner is hindered if the communication partner is present in a direction viewed from the antenna toward the region in which the ripple of the directional characteristics is the minimum value.

An object of the present invention is to reduce a ripple of directional characteristics at the time of transmission or reception. Other objects of the present invention will become apparent from the disclosure of the present specification.

Solution to Problem

An aspect of the present invention is an antenna device including: an antenna housing in which a hollow portion is formed; an antenna located inside the antenna housing and configured to perform at least one of transmission and reception of electric waves; and a scatterer configured to scatter the electric waves propagating through the hollow portion at a predetermined position of the antenna housing.

According to the above aspect, the scatterer scatters the electric waves propagating through the hollow portion of the antenna housing at the predetermined position, so that the ripple of the directional characteristics at the time of transmission or reception can be reduced.

DESCRIPTION OF EMBODIMENTS

Figure 1:
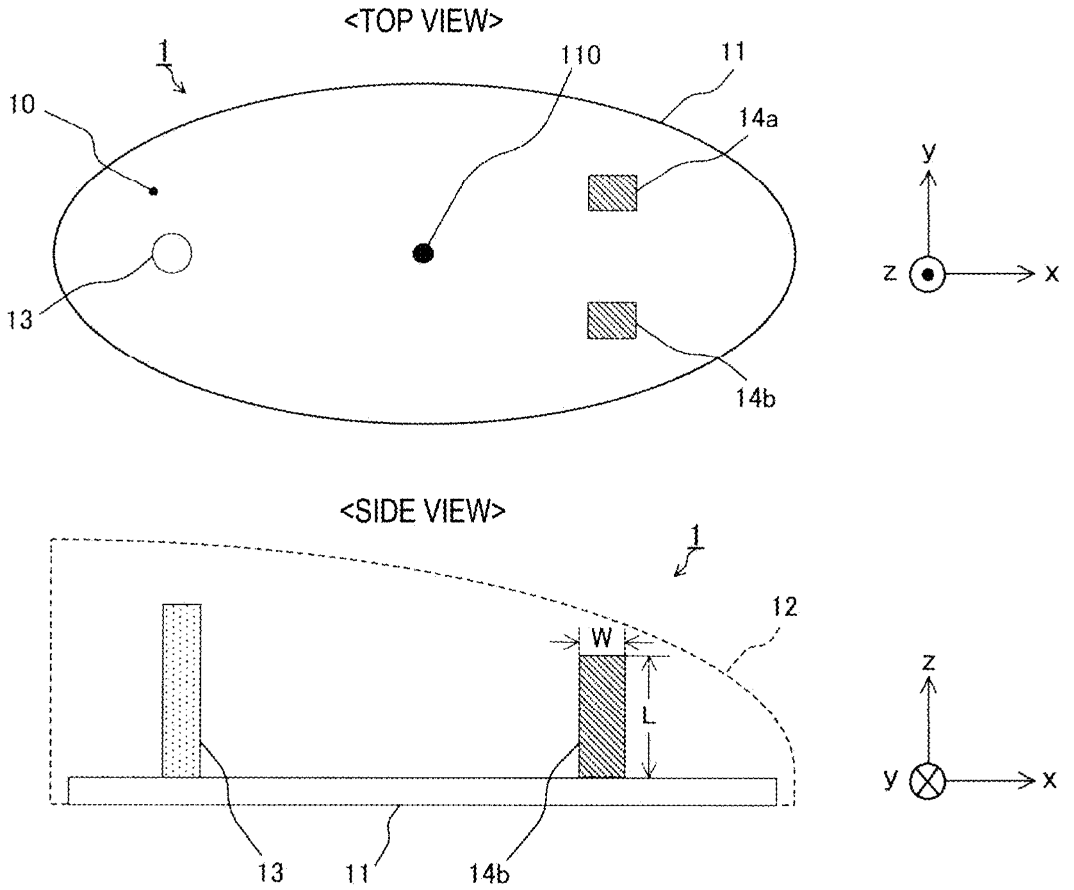
FIG. 1 is an explanatory structural view of an antenna device according to a first embodiment.

Hereinafter, an embodiment in which the present invention is applied to an antenna device including an antenna housing attachable to the roof or the like of a vehicle will be described. In the present specification, the x/y/z-directions are defined as the front, rear, left, right, top, and bottom as viewed from the driver's seat of the vehicle. The z-direction is the normal direction with respect to the bottom surface of the antenna device. The x-direction is one of horizontal directions perpendicular to the z-direction. The y-direction is one of horizontal directions perpendicular to the z-direction and the x-direction. In the present specification, it is assumed that the x-direction is the front-rear direction (front is +, rear is −), the y-direction is the left-right direction (left is +, right is −), and the z-direction is the top-bottom direction (top is +, bottom is −). In addition, in the drawings, directions indicated by arrows of an x-axis, a y-axis, and a z-axis may be referred to as the front, the left, and the top. A plane including the x-axis and the y-axis may be referred to as an xy plane or a horizontal plane. In addition, viewing the antenna device from the top may be referred to as a top view, viewing the antenna device from the left/right may be referred to as a side view, and viewing the antenna device from the left top/right top/left bottom/right bottom/left front/right front/left rear/right rear may be referred to as a perspective view.

First Embodiment

FIG. 1 is an explanatory structural view of an antenna device according to a first embodiment. The antenna device 1 of the first embodiment includes an antenna housing 10. The antenna housing 10 has a hollow portion therein. The hollow portion is a space for accommodating an antenna and antenna components. The antenna housing 10 includes, for example, an antenna base 11 substantially elliptical in a top view and an antenna case 12 defining a space together with the antenna base. The antenna base 11 is a conductive base having a certain intensity or more, such as aluminum die casting. However, the antenna base 11 may be formed from one or more metal plates formed of sheet metal. Alternatively, the antenna base 11 may be formed from one or more metal plates and a conductive base. Alternatively, the antenna base 11 may be from an insulating base made of resin or the like, and at least one of a conductive base and one or more metal plates. The antenna case 12 is made of a hollow three-dimensional resin that seals the antenna base 11. However, for convenience, the antenna case 12 is omitted in the top view of FIG. 1, and the antenna case 12 is indicated by a broken line in the side view.

The top surface side of the antenna base 11 is provided with an antenna 13 and two conductor bars 14*a*, 14*b* as an example of a scatterer. The antenna 13 is a resonant element having a linear shape, a bar shape, a surface shape, a spiral shape, or a zigzag shape extending in the +z-direction from the feed point thereof. The resonance frequency (hereinafter, may be referred to as "operation frequency") of the antenna 13 in the first embodiment is, for example, 5.9 GHz band (wavelength λ: about 50 mm) which is one of the V2X bands. The antenna 13 may be an antenna called a monopole antenna, a dipole antenna, a sleeve antenna, a colinear antenna, a slot antenna, a slit antenna, or a patch antenna.

The two conductor bars 14*a*, 14*b* are arranged, for example, in front of the antenna 13 at predetermined positions for scattering the propagation of electric waves in the hollow portion of the antenna housing 10, and are arranged at a predetermined height substantially parallel to the antenna 13. Each of the conductor bars 14*a*, 14*b* is electrically connected to the conductive antenna base 11 to form a grounded scatterer. In the first embodiment, each of the conductor bars 14*a*, 14*b* is a quadrangular prism conductor having a length in the z-direction (height) from the antenna base 11 of L [mm] and a dimension of each side of W [mm], but the cross-sectional shape and size of each may be set freely. The shape of each of the conductor bars 14*a*, 14*b* is not limited to a quadrangular prism shape or a bar shape, and may be a cylindrical shape, an elliptical cylindrical shape, an elongated cylindrical shape, a polygonal prism shape, a bottomed tubular shape, a cylindrical tubular shape, an elliptical tubular shape, an elongated cylindrical tubular shape, a polygonal tubular shape, a conical shape, an elliptical conical shape, an elongated conical shape, a polygonal pyramid shape, a surface shape, a spiral shape, or a zigzag shape.

The predetermined position is a position of the antenna housing 10 where the deviation of the intensity distribution of the electric waves is relatively small. Alternatively, the predetermined position is a position that can affect the interference and the like of traveling waves, reflected waves, and the like propagating in the antenna housing 10, thereby relatively reducing a difference between a maximum value and a minimum value (level deviation) of the ripple of the directional characteristics in the antenna housing 10. For example, the predetermined position is a position where the difference between the maximum value and the minimum value of the ripple of the directional characteristics becomes relatively small by arranging the structures in the first embodiment such as the conductor bars 14*a*, 14*b*.

The predetermined length (height) is, for example, the distance between the attachment position on the vehicle roof and the highest point of the structures existing in the hollow portion of the antenna housing 10 in the top direction (z-direction) in a state where the antenna device 1 is installed on the vehicle roof, except for the inner surface of the antenna case 12 and the antenna 13.

In the example of FIG. 1, the shape of the antenna base 11 is symmetrical on both sides of the x-axis in a horizontal plane. The x-axis referred to here is a central axis connecting the longitudinal ends of the antenna base 11. The distance between the longitudinal ends on the x-axis connecting the center of the antenna 13 and the geometric center 110 of the antenna base 11 is about 220 mm, and the distance between the lateral ends in the y-direction passing through the geometric center 110 is about 90 mm.

The antenna 13 is arranged at a position 90 mm away from the geometric center 110 in the −x-direction on the central axis (x-axis) connecting the longitudinal ends of the antenna base 11 in the x-direction. The two conductor bars 14*a*, 14*b* are arranged parallel to the antenna 13, one in the +y-direction and one in the −y-direction at equal distances from the central axis connecting the longitudinal ends of the antenna base 11, with a position on the central axis 90 mm away from the geometric center 110 in the +x-direction as a base point.

The shortest distance (interval) between the two conductor bars 14*a*, 14*b* facing each other is 35 mm in the case of the 5.9 GHz band, for example. The length in the z-direction (height) of the antenna 13 is about 12.5 mm, which is the resonance wavelength λ of the operation frequency. In this case, the length L of the two conductor bars 14*a*, 14*b* in the z-direction is about 11 mm.

Figure 2:
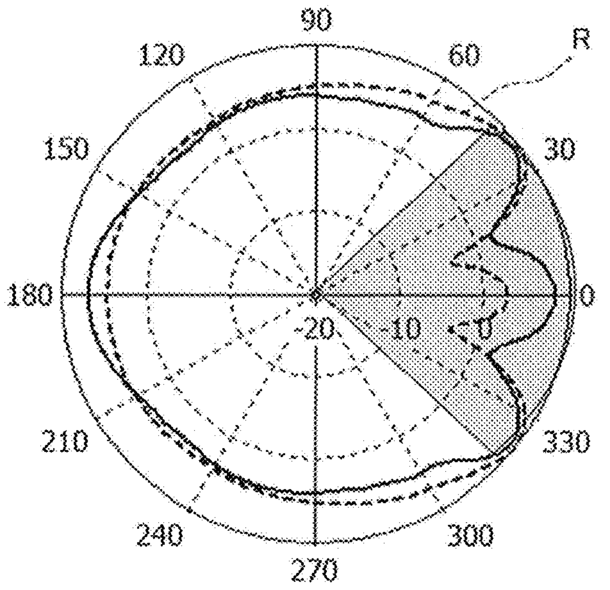
FIG. 2 is a directional characteristic diagram in a horizontal plane of the antenna device according to the first embodiment.

The directional characteristics in a horizontal plane (xy plane) of the antenna device 1 according to the first embodiment are indicated by a solid line in FIG. 2. In addition, the directional characteristics in a horizontal plane (xy plane) of a comparative antenna device R serving as a comparative example are indicated by a thick broken line in FIG. 2. The comparative antenna device R is different from the antenna device 1 of the first embodiment in that the number of conductor bars is absent, that is, the number of conductor bars is zero. The shape, structure, and size of the comparative antenna device R are the same as those of the antenna device 1 of the first embodiment.

In FIG. 2, the front (+x-direction) of the antenna 13 is defined as 0 degrees, and this angle (0 degrees) is defined as a reference angle. FIG. 2 illustrates the directional characteristics in a horizontal plane at measurement points from the reference angle up to 360 degrees (=0 degrees), shifted by every 30 degrees counterclockwise. The radial direction indicates the level (the gain on the antenna 13 side), and the unit is [dBi], but is expressed as [dB] in the drawings and the following description. In the drawings and the following description, the level (gain) is referred to as "level", and the deviation of the level (gain) is referred to as "level deviation".

Figure 3:
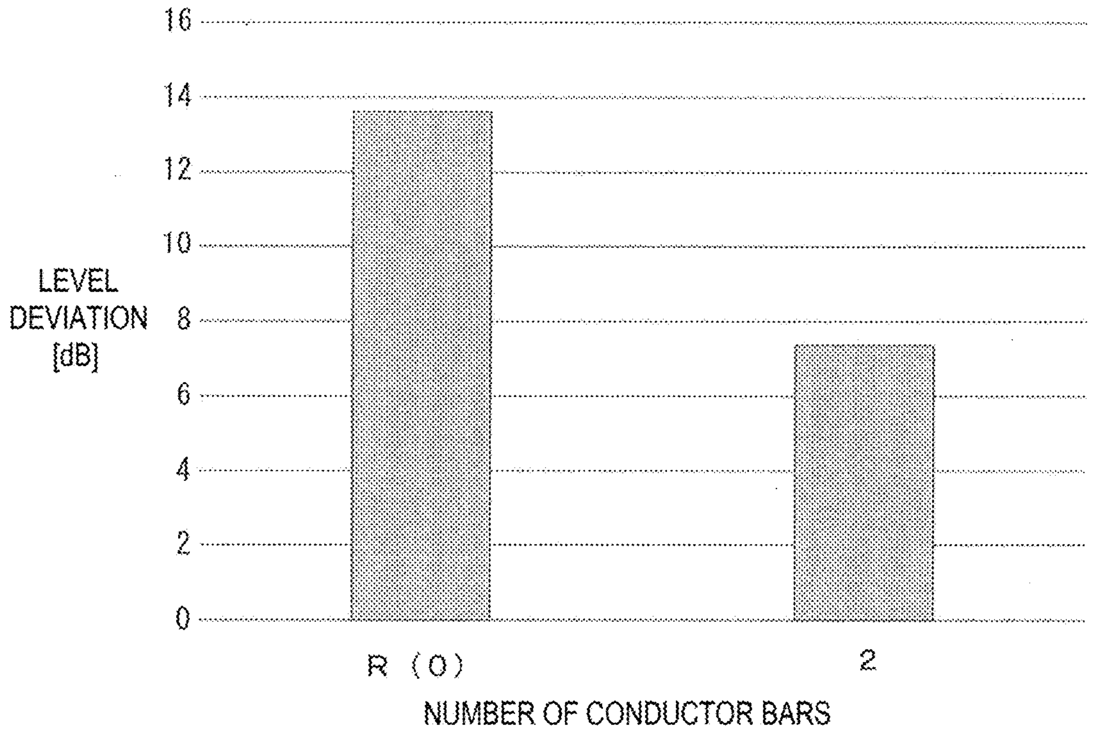
FIG. 3 is a graph of the level deviation of the antenna device according to the first embodiment and a comparative antenna device.

An angle range in the antenna device 1 of the first embodiment in which the level deviation from the comparative antenna device R is significant is indicated by hatching in FIG. 2. The angle range is a range of 45 degrees and 315 degrees relative to the reference angle, that is, ±45 degrees relative to the reference angle. FIG. 3 illustrates a graph of the level deviation of the antenna device 1 having two conductor bars and the level deviation of the comparative antenna device R having zero conductor bars in this angle range.

In the directional characteristic diagram of FIG. 2, the level at the reference angle (0 degree) of the comparative antenna device R is 2.59 dB. On the other hand, in the antenna device 1 of the first embodiment, the level at the reference angle is 8.15 dB, which is increased by 5.56 dB. The level deviation of the comparative antenna device R in the above angle range is 13.63 dB as illustrated in FIG. 3, but is 7.37 dB in the antenna device 1 of the first embodiment, which is reduced by 6.26 dB.

The comparative antenna device R is only provided with the antenna base 11 and the antenna case 12 in addition to the antenna 13, but, as illustrated by the broken line in FIG. 2, has positions where the gain sharply drops (null points) at about 15 degrees and about 345 degrees from the reference angle (about ±15 degrees from the reference angle). This phenomenon occurs mainly because the electric waves radiated from the antenna 13 are scattered when passing through the antenna case 12.

However, by arranging the two conductor bars 14*a*, 14*b* at predetermined positions of the antenna base 11 as in the first embodiment, the scattering mode of the electric waves in the hollow portion of the antenna housing 10 is changed from the scattering mode in the case of the antenna case 12 alone. That is, the scattering mode according to the first embodiment includes scattering due to the antenna case 12 and scattering due to the conductor bars 14*a*, 14*b*. As a result, the null points at about 15 degrees and about 345 degrees from the reference angle (about ±15 degrees from the reference angle) were relaxed, and the level at the reference angle was also increased. In addition, the ripple within the above angle range was also significantly reduced. That is, by adding the conductor bars 14*a*, 14*b* later to the already designed and manufactured antenna housing 10, not only the ripple reduction effect can be obtained, but also the directional characteristics of the antenna 13 can be changed later.

Modification 1

Figure 4:
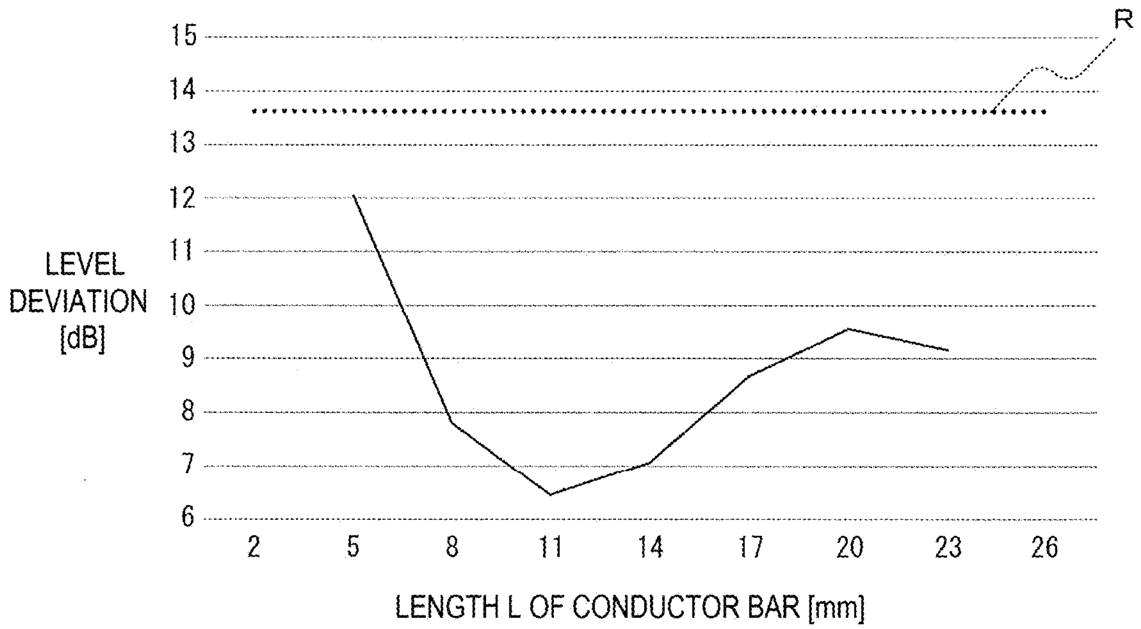
FIG. 4 is a graph illustrating the effect of the length of a conductor bar on the level (gain) deviation.

The effect of the length L of the conductor bars 14*a*, 14*b* on the level deviation is indicated by a solid line in the graph of FIG. 4. As a comparative example, the level deviation of the comparative antenna device R is indicated by a dotted line in the graph of FIG. 4. The level deviation of the comparative antenna device R without conductor bars is 13.63 dB. On the other hand, in the case of the antenna device 1 of the first embodiment, the level deviation was 12.04 dB at the length L of the two conductor bars 14*a*, 14*b* of 5 mm, 7.81 dB at 8 mm, 6.46 dB at 11 mm, 7.07 dB at 14 mm, 8.68 dB at 17 mm, 9.55 dB at 20 mm, and 9.16 dB at 23 mm.

That is, the ripple reduction effect can be obtained by setting the length L of the conductor bars 14*a*, 14*b* to 1/10 or more of the wavelength λ of the operation frequency of the antenna 13 (5 mm or more in the case of the operation frequency of the first embodiment). In particular, the ripple reduction effect becomes significant if the length L is about 1/4 the wavelength λ (11 mm in the case of the operation frequency of the first embodiment).

Modification 2

Figure 5:
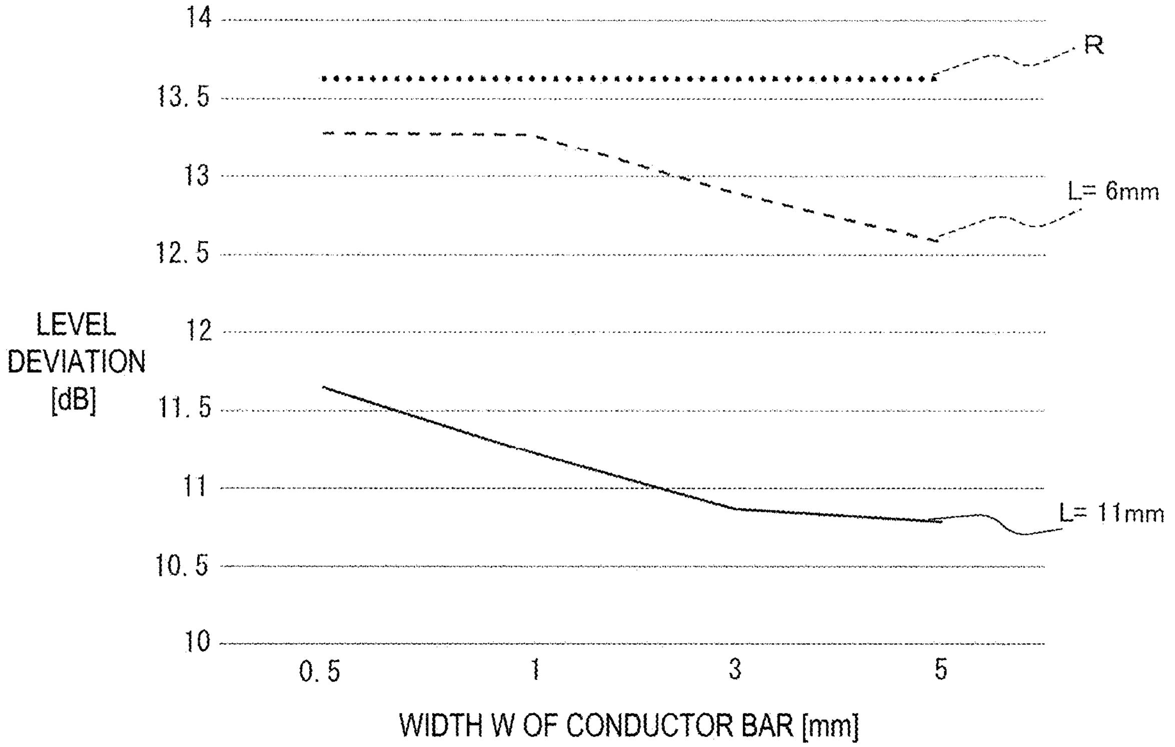
FIG. 5 is a graph illustrating the effect of the size in the horizontal plane of the conductor bar on the level deviation.

The effect of the size (thickness) W in the horizontal plane of the conductor bars 14*a*, 14*b* on the level deviation is indicated by a solid line and a long broken line in the graph of FIG. 5. As a comparative example, the level deviation of the comparative antenna device R is indicated by a dotted line in the graph of FIG. 5. The level deviation of the comparative antenna device R is 13.63 dB as described above. On the other hand, in the antenna device 1 of the first embodiment, the level deviation at a length L of 6 mm was 13.28 dB at a size W of each side of the conductor bars 14*a*, 14*b* of 0.5 mm, 13.27 dB at 1 mm, 12.89 dB at 3 mm, and 12.58 dB at 5 mm.

In addition, in the antenna device 1 of the first embodiment, the level deviation at a length L of 11 mm was 11.65 dB at a size W of each side of the conductor bars 14*a*, 14*b* of 0.5 mm, 11.23 dB at 1 mm, 10.87 dB at 3 mm, and 10.79 dB at 5 mm. That is, even if the length L of the conductor bars 14*a*, 14*b* cannot be secured sufficiently, the ripple reduction effect can be obtained by making the size W of the conductor bars 14*a*, 14*b* in the horizontal plane larger than that of the antenna 13. In addition, the ripple reduction effect can be obtained significantly by increasing the size W if the length L of the conductor bars 14*a*, 14*b* is about ¼ the wavelength λ of the operation frequency of the antenna 13 (11 mm in the case of the operation frequency of the first embodiment).

Modification 3

Figure 6:
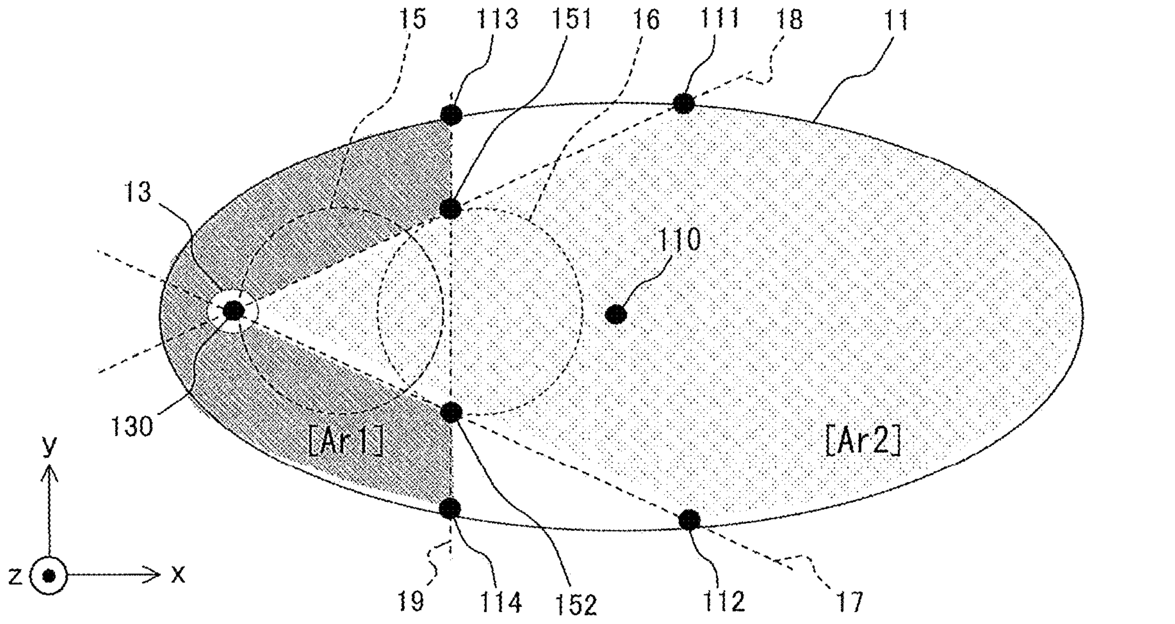
FIG. 6 is an explanatory view of a region serving as a candidate for a position where the conductor bar can be arranged.

The positions for arranging the conductor bars 14*a*, 14*b* may be positions other than those illustrated in FIG. 1. Here, a region serving as a candidate of a position where the conductor bars 14*a*, 14*b* can be arranged will be described with reference to FIGS. 6 to 10. FIG. 6 is an explanatory view of the region serving as a candidate for a position where the conductor bars can be arranged, and is a top view of the antenna base 11.

Here, a first circle 15 and a second circle 16 are defined for convenience in describing the above region. The first circle 15 is a circle having its center on the x-axis connecting the feed position 130 of the antenna 13 and the geometric center 110 of the antenna base 11. Further, the first circle 15 is a circle whose radius is ½ the wavelength λ of the operation frequency, and is a circle passing through the feed position 130 of the antenna 13. If the conductor bars 14*a*, 14*b* are grounded to the antenna base 11, the second circle 16 is a circle obtained by moving the first circle 15 on the x-axis by a distance of the length (height) L [mm]×2 times from the feed position 130 of the antenna 13.

Although not illustrated in FIG. 6, if the conductor bars 14*a*, 14*b* are not grounded to the antenna base 11, the second circle 16 is a circle obtained by moving the first circle 15 on the x-axis by a distance of the length (height) L [mm]×1 time from the feed position 130 of the antenna 13. Two tangent lines passing through the feed position 130 of the antenna 13 and in contact with the second circle 16 are defined as tangent lines 17, 18, respectively. The points where the second circle and the two tangent lines 17, 18 are in contact are defined as contact points 151, 152, respectively. The intersections of the inner edge of the antenna base 11 and the two tangent lines 17, 18 are defined as intersections 111, 112, respectively. The intersections of a line 19 connecting the contact points 151, 152 of the second circle 16 in the y-direction and the inner edge of the antenna base 11 are defined as intersections 113, 114, respectively.

A first candidate region Ar1 serving as a candidate of a position where the conductor bars 14*a*, 14*b* can be arranged may be a region on the rear side of the x-axis inside the antenna base 11, which connects the intersection 113 to the contact 151 to the feed position 130 of the antenna 13 to the contact 152 to the intersection 114 to the intersection 113. A second candidate region Ar2 serving as a candidate of a position where the conductor bars 14*a*, 14*b* can be arranged may be a region on the front side of the x-axis inside the antenna base 11, which connects the intersection 111 to the contact 151 to the feed position 130 of the antenna 13 to the contact 152 to the intersection 112 to the intersection 111.

Figure 7:
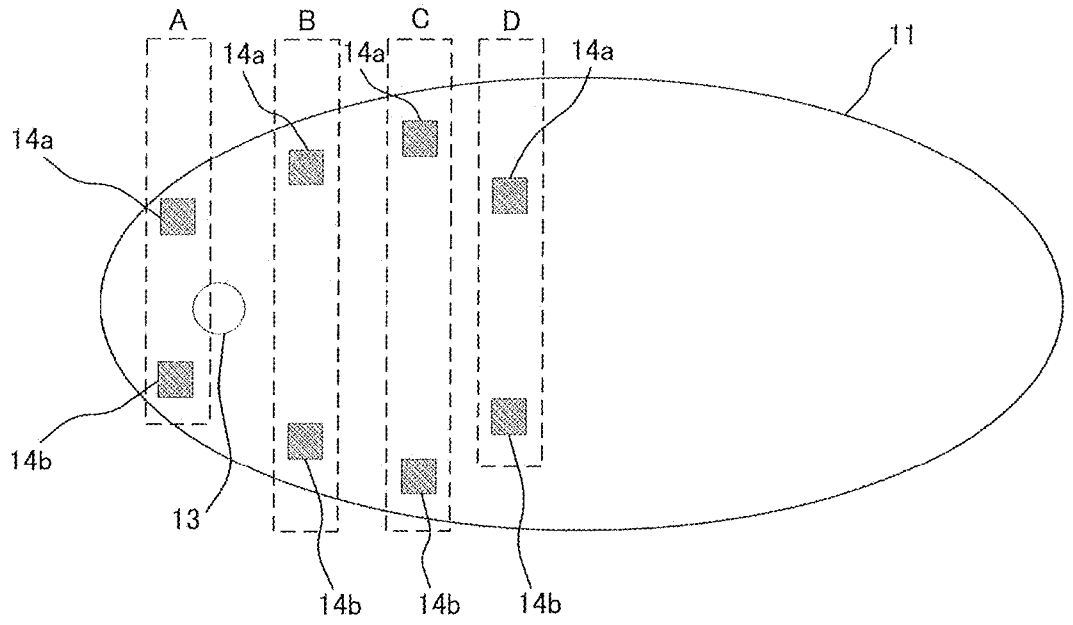
FIG. 7 is an explanatory view of a plurality of areas as candidates for arranging the conductor bar.

FIG. 7 is an explanatory view of a plurality of areas serving as arrangement candidates of the two conductor bars 14*a*, 14*b* in the first candidate region Ar1 and the second candidate region Ar2 defined in FIG. 6. A first area A is an area behind the antenna 13 in the first candidate region Ar1. A second area B is an area farther from the antenna 13 than is the first area A in a region in front of the antenna 13 in the first candidate region Ar1. A third area C is an area farther from the antenna 13 than is the second area B in the region in front of the antenna 13 in the first candidate region Ar1 inside the antenna base 11. A fourth area D is an area closer to the antenna 13 than is the position illustrated in FIG. 1 in the second candidate region Ar2.

The interval between the conductor bars 14*a*, 14*b* is 12.5 mm in the area A, 17.5 mm in the area B, 27.5 mm in the area C, and 15 mm in the area D. The height of both the conductor bars 14*a*, 14*b* is 11 mm.

Figure 8:
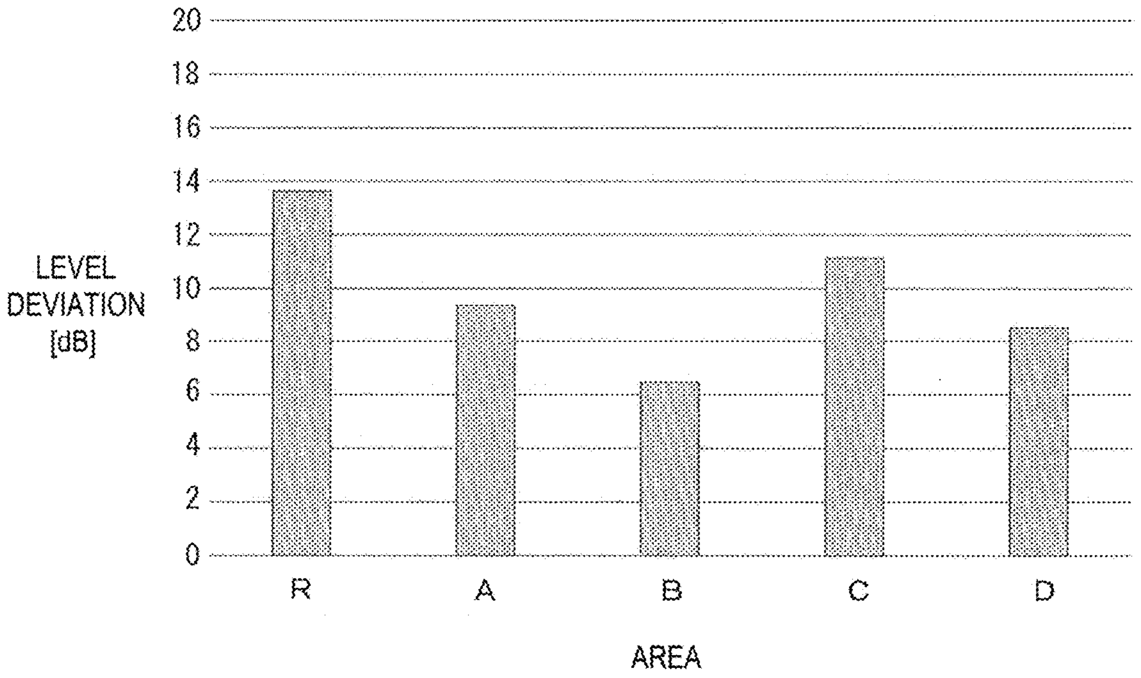
FIG. 8 is a graph illustrating the level deviation in the areas of FIG. 7.

FIG. 8 is a graph illustrating the level deviation in the areas A to D illustrated in FIG. 7. As a comparative example, the level deviation of the comparative antenna device R is also illustrated in the graph of FIG. 8. The level deviation of the comparative antenna device R is constant at 13.63 dB as described above. On the other hand, the level deviation of the antenna device 1 of the first embodiment is 9.38 dB in the area A, 6.46 dB in the area B, 11.15 dB in the area C, and 8.54 dB in the area D. Therefore, the ripple reduction effect is also obtained in the first candidate region Ar1 and the second candidate region Ar2.

Figure 9:
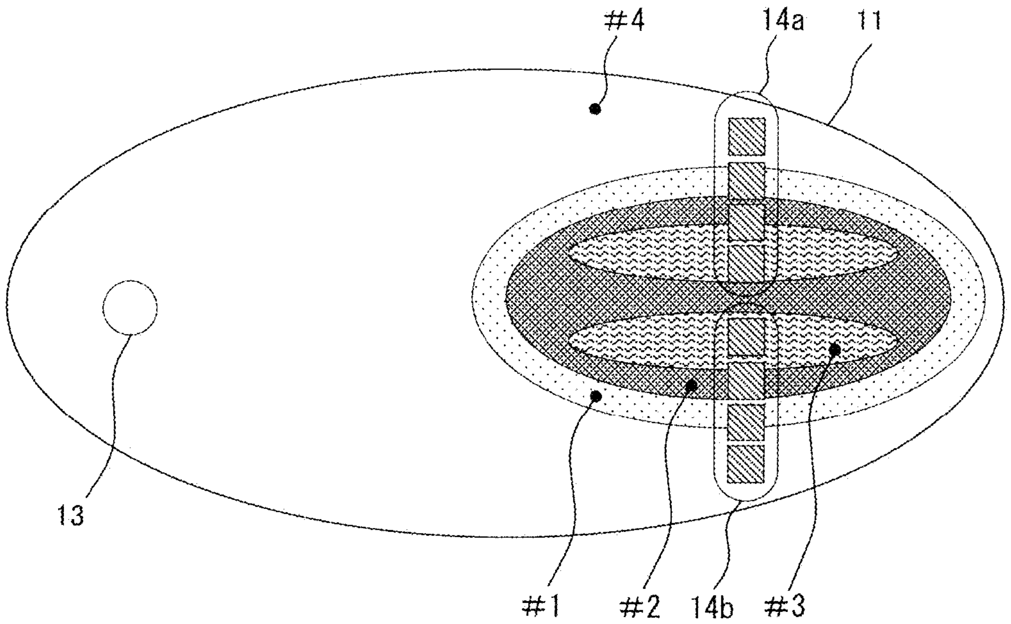
FIG. 9 is an explanatory view of a plurality of areas illustrating a difference in the interval between two conductor bars.

FIG. 9 is an explanatory view of a plurality of areas illustrating the difference in the interval between the two conductor bars, and in particular, is an explanatory view of a plurality of areas roughly classifying the arrangement of the two conductor bars 14*a*, 14*b* in the second candidate region Ar2.

If the antenna 13 is present on the rear side of the antenna device 1, the reduction effect of the level deviation can be obtained by arranging the two conductor bars 14*a*, 14*b* substantially on the rear side of the antenna device 1. In particular, the reduction effect of the level deviation becomes more significant by arranging on both sides of the x-axis at a constant interval, that is, an interval about ½ the wavelength λ.

In the example of FIG. 9, the conductor bars 14*a*, 14*b* are arranged at equal distances in the +y-direction and the −y-direction on both sides of the central axis of the antenna base 11 (x-axis). An area #3 is an area substantially on the front side of the antenna device 1, in which the two conductor bars 14*a*, 14*b* are arranged on both sides of the x-axis at a constant interval, that is, an interval about ½ the wavelength λ. An area #2 is an area substantially on the front side of the antenna device 1, in which, however, the two conductor bars 14*a*, 14*b* are arranged at an interval slightly farther or closer than the interval about ½ the wavelength λ. An area #1 is an area substantially on the front side of the antenna device 1, in which, however, the interval of the two conductor bars 14*a*, 14*b* is farther than that of the area #2. The length L in the z-direction of both the conductor bars 14*a*, 14*b* is 11 mm. Here, the area #4 is a region that does not belong to either of the candidate regions Ar1 and Ar2 and is close to the periphery of the antenna base 11.

Figure 10:
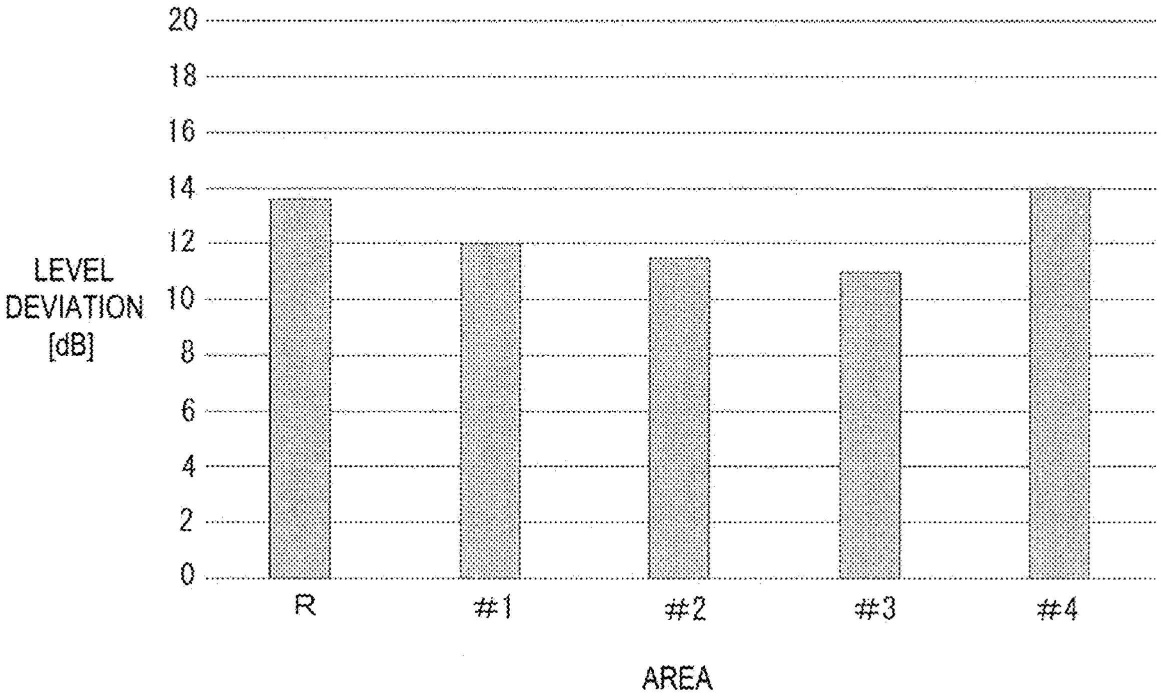
FIG. 10 is a graph illustrating the level deviation in the areas illustrated in FIG. 9.

FIG. 10 is a graph illustrating the level deviation in the areas #1 to #4 illustrated in FIG. 9. As a comparative example, the level deviation of the comparative antenna device R is also illustrated in the graph of FIG. 10. The level deviation of the comparative antenna device R is 13.63 dB as described above. On the other hand, the level deviation of the antenna device 1 of the first embodiment is 11.99 dB in the area #1, 11.47 dB in the area #2, 10.95 dB in the area #3, and 14.02 dB in the area #4. Further, the ripple reduction effect can be obtained in all the areas #1 to #3. However, the level deviation is increased in area #4.

As described above, if the antenna 13 is present on the rear side of the antenna base 11, the reduction effect of the level deviation of the antenna device 1 can be achieved by arranging the two conductor bars 14*a*, 14*b* substantially on the front side of the antenna base 11. In particular, it can be seen that the ripple reduction effect can be effectively exerted by arranging the conductor bars 14*a*, 14*b* on both sides of the x-axis at a constant interval, that is, an interval about ½ the wavelength λ. On the other hand, it can be seen that the ripple cannot be improved sufficiently in the regions other than the candidate regions Ar1 and Ar2.

Modification 4

Figure 11:
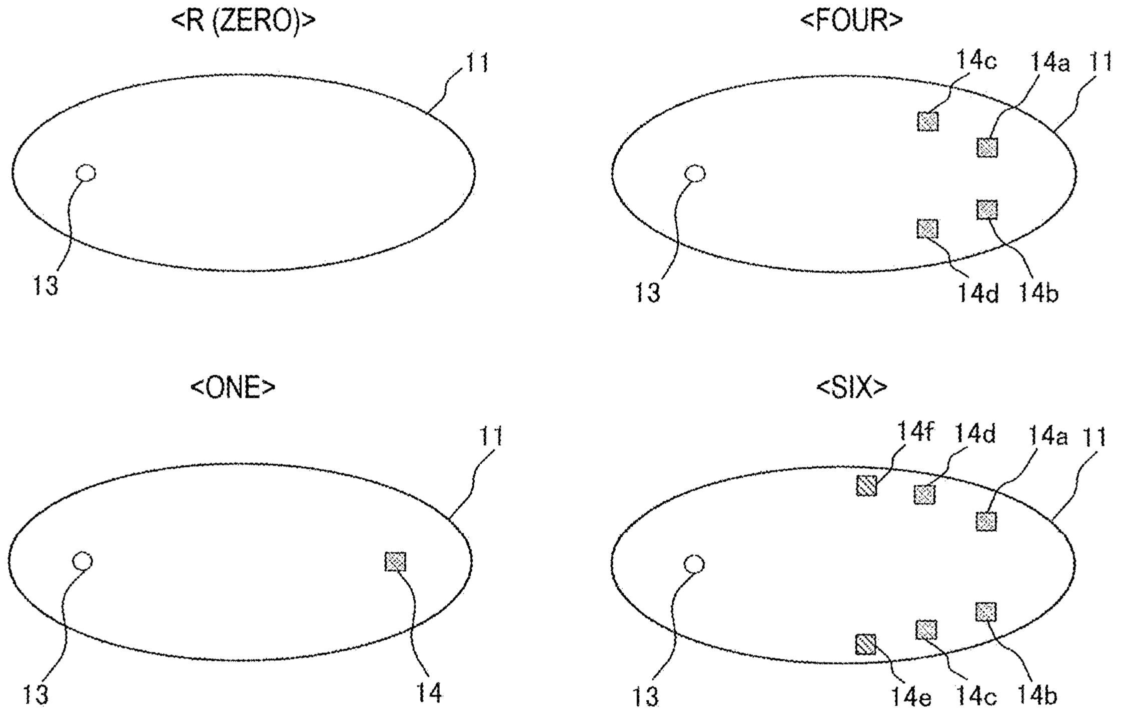
FIG. 11 is an explanatory structural view of an antenna device in which the number of conductor bars is changed.

The number of conductor bars used as the scatterer is not limited to two. FIG. 11 is a diagram illustrating a structural example of an antenna device according to Modification 4 of the first embodiment, and is an explanatory structural view of the structure of an antenna device in which the number of conductor bars is changed. If the number of conductor bars is one, for example, the one conductor bar 14 is arranged on the x-axis, which is the central axis of the antenna base 11. The distance between the antenna 13 and the conductor bar 14 may be a distance at which the conductor bar 14 acts as a waveguide of the antenna 13.

If the number of the conductor bars is four, for example, two of the conductor bars 14*a*, 14*b* may be arranged at the same positions as those in FIG. 1, and the other two conductor bars 14*c*, 14*d* may be arranged at equal distances from the x-axis at positions closer to the antenna 13 than are the conductor bars 14*a*, 14*b* and at larger intervals than those of the conductor bars 14*a*, 14*b*. If the number of conductor bars is six, for example, four of the conductor bars 14*a*, 14*b*, 14*c*, and 14*d* may be arranged in the same manner as in the case where the number of conductor bars is four, and the other two conductor bars 14*e*, 14*f* may be arranged in the first candidate region Ar1 at equal distances from the x-axis. However, the positions of the conductor bars in the case of six may not be as illustrated in FIG. 11. Further, the number of the conductor bars is not limited to even, and may be odd such as three or five.

Figure 12:
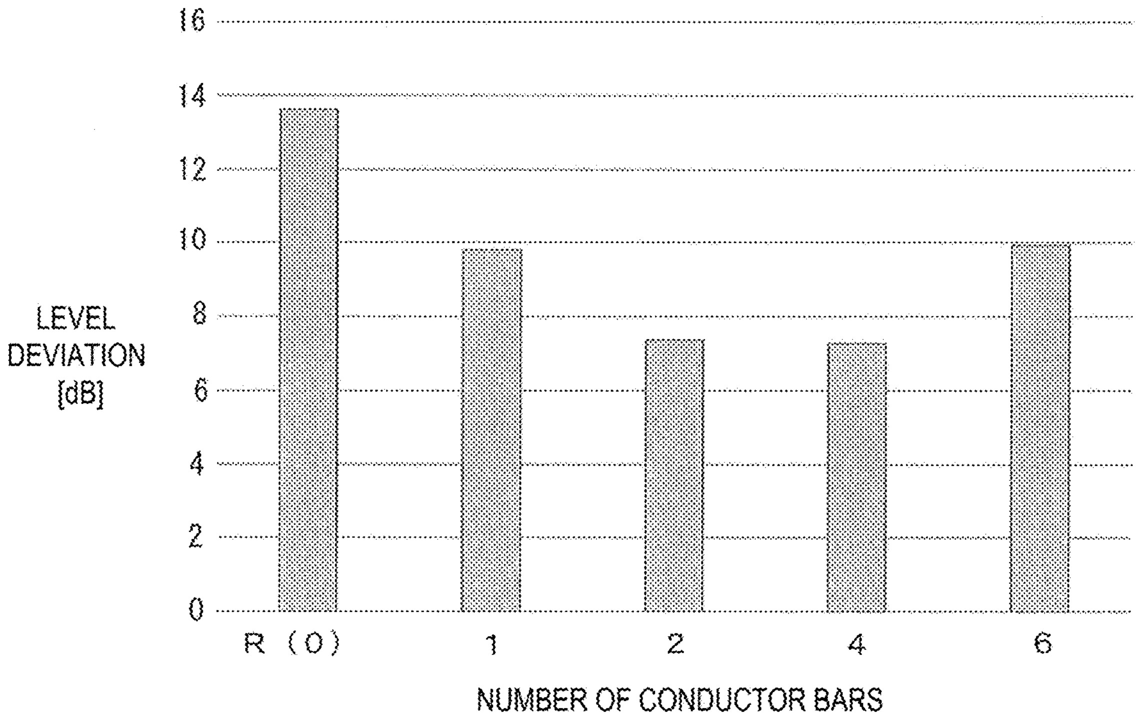
FIG. 12 is a graph illustrating the level deviation at the numbers of conductor bars of the aspects illustrated in FIG. 11.

FIG. 12 is a graph illustrating the level deviation at each number of conductor bars of the aspects illustrated in FIG. 11. As a comparative example, the level deviation of the comparative antenna device R is also illustrated in the graph of FIG. 12. As described above, the level deviation of the comparative antenna device R is 13.63 dB, and becomes 7.37 dB if the number of conductor bars is two. On the other hand, in the antenna device 1 of the first embodiment, the level deviation is 9.80 dB in the case of one conductor bar, 7.27 dB in the case of four conductor bars, and 9.93 dB in the case of six conductor bars. The ripple reduction effect can be obtained even if there is one or more conductor bars. However, the ripple reduction effect is larger with two or four conductor bars than with one conductor bar. By increasing the number of conductor bars to three or more, the level deviation can be limited more than in the case of two conductor bars. On the other hand, it should be noted that the reduction effect of the level deviation may converge if the number of conductor bars is simply increased.

Modification 5

The conductor bars 14*a*, 14*b* may be insulated from the antenna base 11. In this case, the conductor bars 14*a*, 14*b* are ungrounded. Therefore, the conductor bars 14*a*, 14*b* at least have a length L in the z-direction different from that in the case of the grounded type in which the conductor bars are electrically connected to the antenna base 11.

Figure 13:
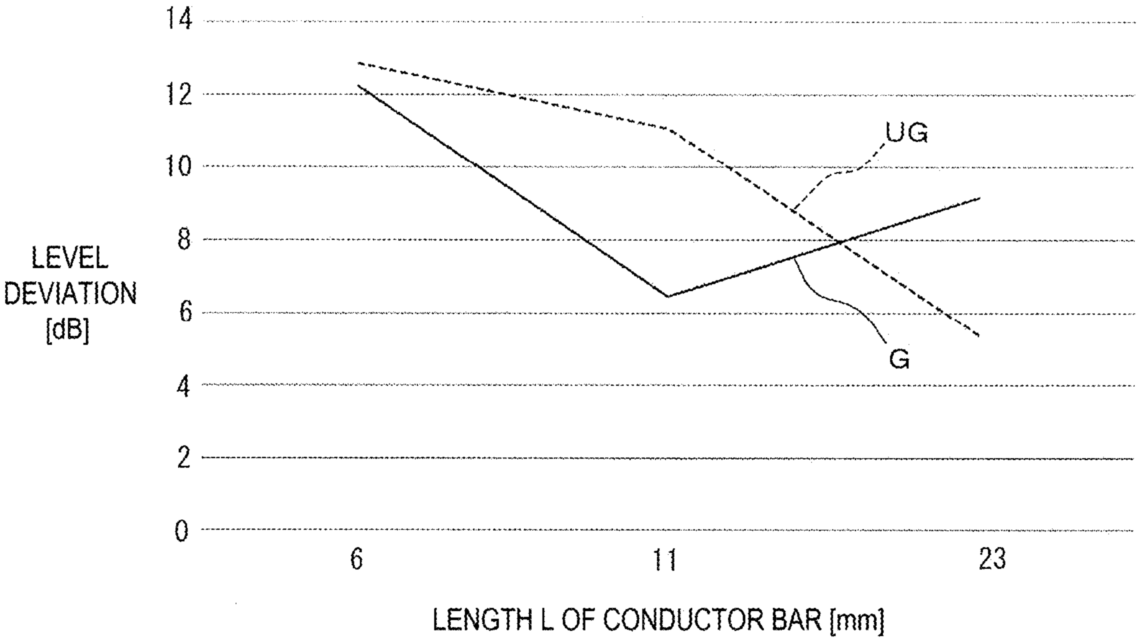
FIG. 13 is a graph illustrating the correlation between the length in the z-direction and the level deviation in the cases where the two conductor bars are grounded and are ungrounded.

FIG. 13 is a graph illustrating the correlation between the length in the z-direction and the level deviation in the cases where the two conductor bars are grounded and are ungrounded. Specifically, the graph illustrates the correlation between the length L in the z-direction and the level deviation with respect to each length L in the cases where the conductor bars 14*a*, 14*b* are grounded G and ungrounded UG, respectively. Referring to FIG. 13, the level deviation in the case where the conductor bars 14*a*, 14*b* are grounded G is 12.25 dB at a length L of 6 mm, 6.46 dB at a length L of 11 mm, and 9.16 dB at a length L of 23 mm. On the other hand, the level deviation in the case where the conductor bars 14*a*, 14*b* are ungrounded UG is 12.87 dB at a length L of 6 mm, 11.07 dB at a length L of 11 mm, and 5.39 dB at a length L of 23 mm.

Accordingly, if the conductor bars 14*a*, 14*b* are grounded G, the ripple reduction effect can be obtained as long as the length L in the z-direction of the conductor bars 14*a*, 14*b* is about ¼ or more of the wavelength λ of the electric waves of the operation frequency of the antenna 13. On the other hand, if the conductor bars 14*a*, 14*b* are ungrounded UG, the ripple reduction effect can be obtained as long as the length L in the z-direction of the conductor bars 14*a*, 14*b* is about ½ or more of the wavelength λ of the electric waves of the operation frequency of the antenna 13.

Further, in the case of grounded G, since the lengths of the conductor bars 14*a*, 14*b* in the z-direction can be made shorter than in the case of ungrounded UG, the height of the antenna case 12 in the top-bottom direction can be limited as compared with the case of ungrounded UG. That is, the ripple can be reduced without impairing the antenna design. Further, in the case of grounded G, the conductor bars 14*a*, 14*b* can be directly fixed to the antenna base 11, which can advantageously eliminate the necessity of separately providing a component for holding the conductor bars 14*a*, 14*b*.

Other Modifications

- The scatterer is not limited to a conductive conductor bar, and may be a non-conductive component or a combination of a conductive component and a non-conductive component.
- The scatterer may be implemented with a joining screw used when joining the antenna case 12 to the antenna base 11, a positioning guide of a cable or a substrate present in the hollow portion of the antenna housing 10, another antenna unit packed in the hollow portion of the antenna housing 10, a metallic screw for attaching the antenna unit to the antenna base 11, or a feed pin. The joining screw and the antenna base 11 are electrically connected by physical contact or capacitive coupling. As a result, no additional members is not required in an existing antenna device for obtaining the ripple reduction effect, which can advantageously reduce the size and the cost. In addition, the joining screws for joining the antenna base 11 to the antenna case 12 can be directly used as scatterers because they are generally arranged symmetrically with respect to the xz plane of the antenna base 11 from the viewpoint of waterproofing and fitting force.

Other than the antenna base 11, the scatterer may be detachably attached to the inner wall of the antenna case 12 or the like, or may be integrally formed as a protrusion protruding at a predetermined angle from the inner wall of the antenna case 12.

The antenna 13 may be arranged close to the geometric center 110 instead of on the rear side of the antenna base 11.

The antenna 13 may be arranged in front of the geometric center 110 of the antenna base 11 instead of on the rear side of the antenna base 11.

Second Embodiment

Figure 14:
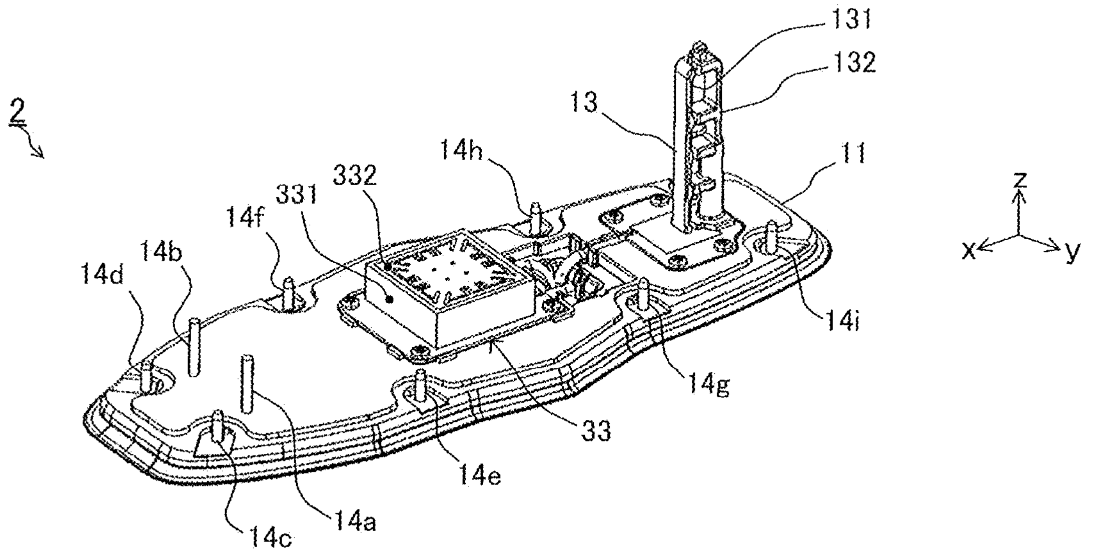
FIG. 14 is a perspective view of an antenna device according to a second embodiment.
Figure 15:
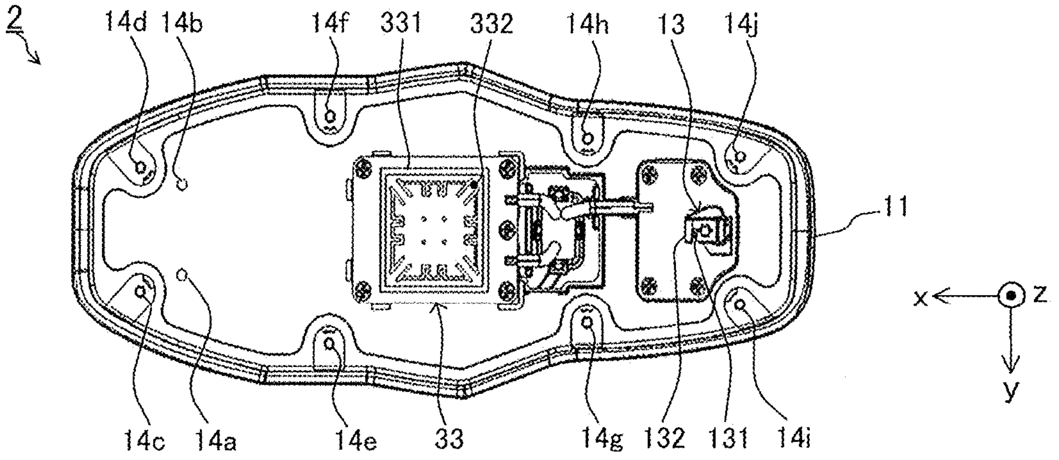
FIG. 15 is a top view of the antenna device according to the second embodiment.
Figure 16:
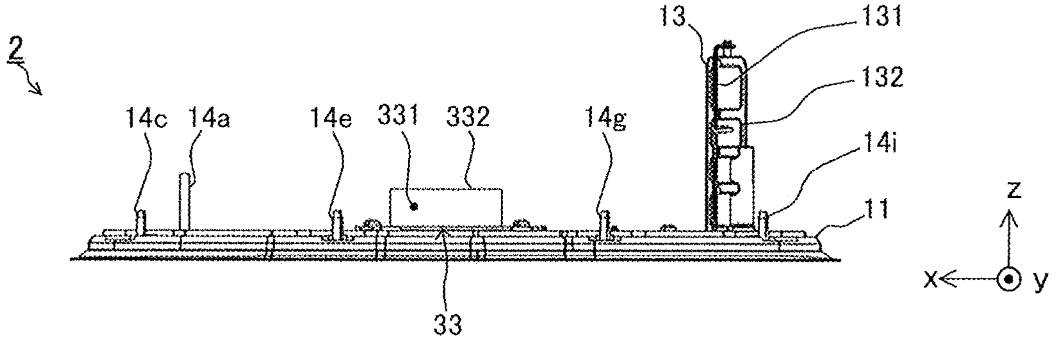
FIG. 16 is a side view of the antenna device according to the second embodiment.

A second embodiment of the present invention will be described. In the second embodiment, an example in which the antenna device 1 of the first embodiment is applied to a specific antenna device will be described with reference to FIGS. 14 to 16. FIG. 14 is a perspective view of an antenna device 2 according to the second embodiment. FIG. 15 is a top view of the antenna device 2 according to the second embodiment. FIG. 16 is a side view of the antenna device 2 according to the second embodiment. In FIGS. 14 to 16, components having the same functions as those of the antenna device 1 of the first embodiment are denoted by the same reference signs for convenience. Further, a structural example in which the antenna case 12 illustrated in FIG. 1 is removed is illustrated.

The antenna device 2 of the second embodiment is a compound antenna device in which the antenna 13 and a satellite-signal-compatible unit 33 are packaged in the same antenna housing. The antenna 13 is a colinear antenna for V2X in which a radiative element 131 and a resin support body 132 for supporting the radiative element 131 extend in the z-direction from the position of the antenna 13 illustrated in FIG. 1.

The radiative element 131 includes a first linear portion linearly extending in the z-direction from the base end serving as a feed portion, a loop-shaped portion, a second linear portion linearly extending in the z-direction again from the loop-shaped portion, and a third linear portion bent rearward close to the tip of the second linear portion. The support body 132 has a framework structure and includes: a pair of pillars extending in the z-direction relative to the antenna base 11; and a plurality of coupling portions connecting the pillars. Each coupling portion is formed with a hole or a notch for fixing the radiative element 131.

The satellite-signal-compatible unit 33 has a dielectric 331, an electrode 332 mounted on the top surface of the dielectric 331, and a feed pin (not illustrated) that electrically connects the electrode 332 and a circuit board on the back side of the dielectric 331. The dielectric 331 has a substantially quadrilateral shape in a top view, and has a thickness (length L) in the z-direction near the geometric center of the conductive antenna base 11. The dielectric 331 of the present embodiment is made of ceramic, but another dielectric having a different dielectric constant or hardness, for example, Teflon (registered trademark) may be used. The electrode 332 is a four-feed electrode formed with slits of a size adjusted for receiving satellite signals, for example, and is mounted substantially parallel to the plate-shaped surface of the antenna base 11. The satellite-signal-compatible unit 33 is away from the antenna 13 by ½ or more of the wavelength λ of the electric waves of the operation frequency of the antenna 13 to avoid interference with the antenna 13, and employs a planar antenna capable of reducing the height in the z-direction to prevent the thickness in the z-direction from affecting the operation of the antenna 13.

The antenna base 11 is not substantially elliptical in a top view as illustrated in FIGS. 1, 6, 7, 9, and 11, and has no roundness in the +x-direction and the −x-direction. The edges of the antenna base 11 in the +y-direction and −y-direction sandwiching the dielectric of the satellite-signal-compatible unit 33 bulge outward from an ellipse in a non-streamline shape. In the antenna device 2 having such a structure, the number of positions where the ripple of the directional characteristics occurs inevitably increases, as compared with the antenna device 1 of the first embodiment in which the antenna base 11 is substantially elliptical in a top view and no other antenna components exist in the antenna housing. Further, the number of joining screws (one of the joining tools) for joining the antenna case 12 to the antenna base 11 in a watertight manner is also larger than that of the antenna device 1 of the first embodiment, which has the antenna base 11 substantially elliptical in a top view.

Therefore, in the antenna device 2 of the second embodiment, in order to reduce the ripple, metallic joining screws for joining the antenna case 12 to the antenna base 11 in a watertight manner are used as the scatterers in addition to the two conductor bars 14*a*, 14*b* having a length of 11 mm or more in the z-direction. The joining screws are denoted as conductor bars 14*c* to 14*j*, respectively. The conductor bars 14*c* to 14*j* may be shorter than the conductor bars 14*a*, 14*b*. Accordingly, as in the first embodiment, the ripple reduction effect can be achieved as compared with the case where the conductor bars 14*a* to 14*j* are not used as scatterers.

The feed pin (not illustrated) for connecting the electrode of the satellite-signal-compatible unit 33 and the circuit board for satellite signals can also be used as a conductor bar. The feed pin is a columnar conductor having substantially the same length as the thickness of a dielectric base on which a patch electrode is placed. The feed pin has a length of about 10 mm, and serves as a ground conductor grounded to the antenna base 11 at a frequency of the V2X band. Accordingly, it is possible to obtain the same operation and effect as those of the other conductor bars functioning as scatterers.

In the antenna device 2 of the second embodiment, resin mounting bosses capable of adjusting the insertion amounts (screwing amounts) of the joining screws (conductor bars 14*a* to 14*j*) are erected at corresponding positions of the antenna base 11. Each mounting boss has a mounting cavity or a mounting hole whose inner wall has a thread groove threaded in the z-direction. A mounting cavity is a bottomed boss, and a mounting hole is a boss to be penetrated by a joining screw.

In an aspect, the mounting cavity or mounting hole in the mounting boss is formed longer than the design value, so that the directional characteristics of the antenna 13 can be adjusted in any direction by changing the lengths or the insertion amounts (screwing amounts) of the conductor bars 14*c* to 14*j* functioning as scatterers among the joining screws. For example, the length in the z-direction functioning as the scatterer can be changed freely by adjusting the screwing amount of any one of the conductor bars 14*c* to 14*j* after assembling the antenna device 2. The lengths of the conductor bars 14*c* to 14*j* may be the same length or may be allowed to be adjusted to different lengths according to the directional characteristics, as long as within a range in which the holding force of the antenna case 12 and the antenna base 11 can be secured.

Further, the mounting bosses may be excessively formed in advance, and as necessary, metallic screws or screws made from a non-conductive component may be detachably mounted on the mounting bosses with an adjustable exposure amount after assembling the antenna device 2. This makes it possible to adjust the ripple reduction amount, and to control or finely adjust the directional characteristics of the antenna 13 in any direction.

Third Embodiment

Figure 17:
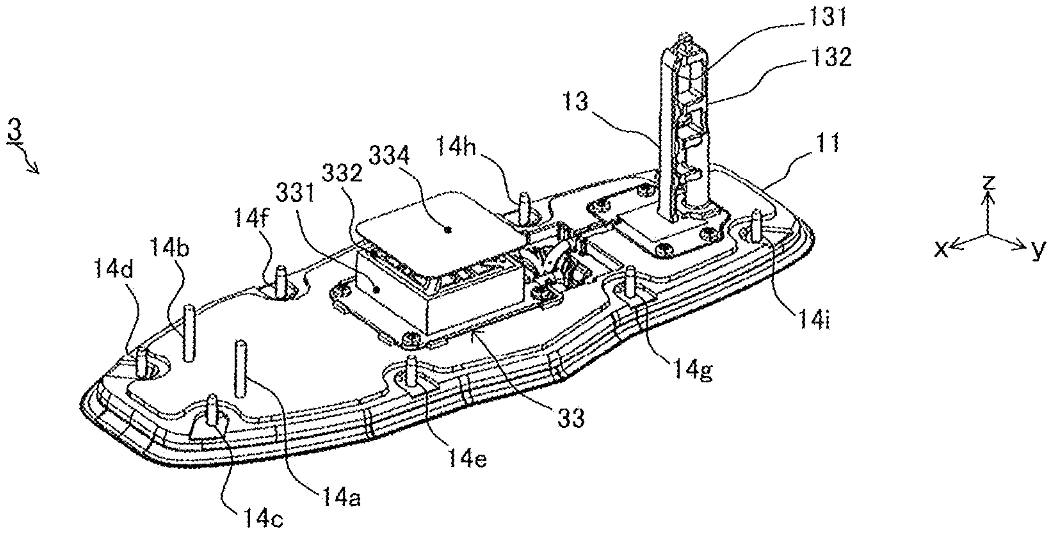
FIG. 17 is a perspective view of an antenna device according to a third embodiment.
Figure 18:
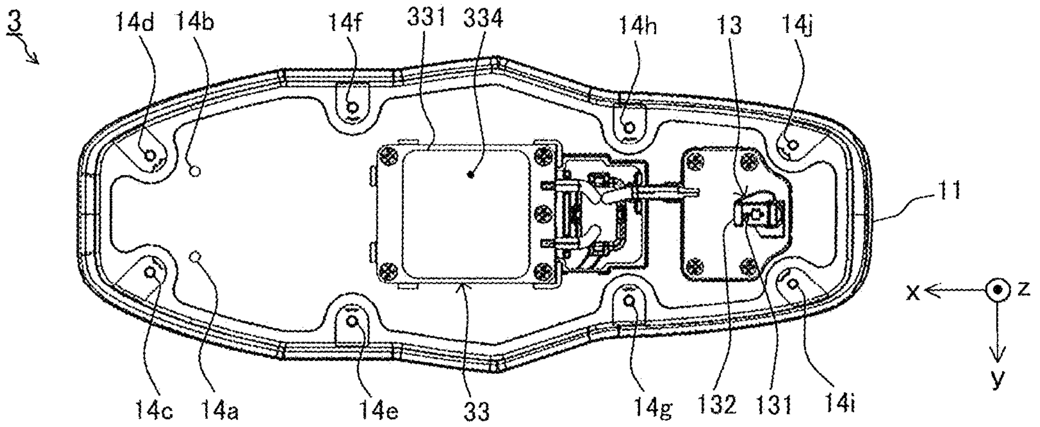
FIG. 18 is a top view of the antenna device according to the third embodiment.
Figure 19:
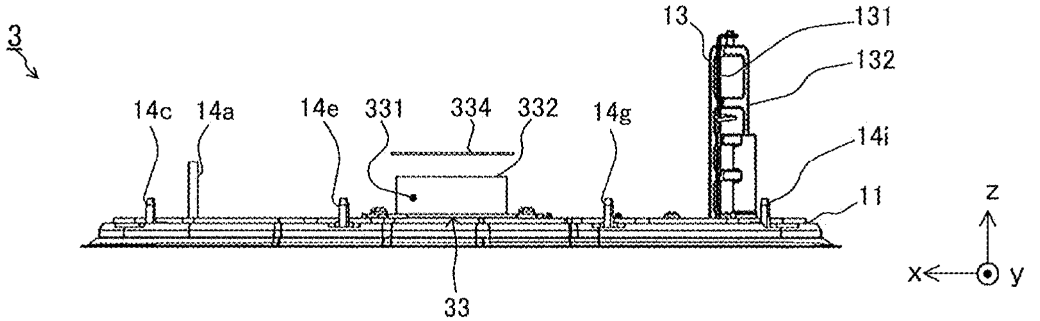
FIG. 19 is a side view of the antenna device according to the third embodiment.

A third embodiment of the present invention will be described. In the third embodiment, an example in which the antenna device 1 of the first embodiment is applied to another antenna device will be described with reference to FIGS. 17 to 19. FIG. 17 is a perspective view of an antenna device 3 according to the third embodiment. FIG. 18 is a top view of the antenna device 3 according to the third embodiment. FIG. 19 is a side view of the antenna device 3 according to the third embodiment. In FIGS. 17 to 19, components having the same functions as those of the antenna device 1 of the first embodiment and the antenna device 2 of the second embodiment are denoted by the same reference signs for convenience. Further, a structural example in which the antenna case 12 illustrated in FIG. 1 is removed is illustrated.

In the antenna device 3 of the third embodiment, the top surface of the electrode 332 of the satellite-signal-compatible unit 33 included in the antenna device 2 of the second embodiment is provided with a conductive parasitic element 334. In the present embodiment, the parasitic element 334 has a plate-shaped surface, and is supported substantially parallel to the surface of the plate-shaped electrode at a predetermined interval by a resin support member. The parasitic element 334 can function as a waveguide of the satellite-signal-compatible unit 33. The resonance frequency can also be changed by forming a hole, a slit, or a slot in the parasitic element 334.

Fourth Embodiment

Figure 20:
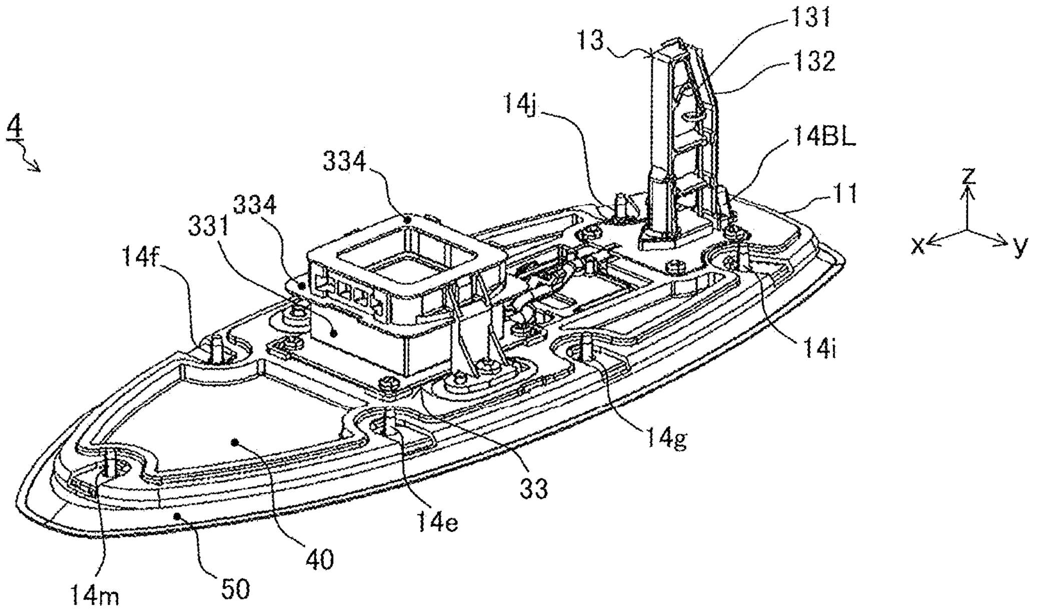
FIG. 20 is a front perspective view of an antenna device according to a fourth embodiment.
Figure 21:
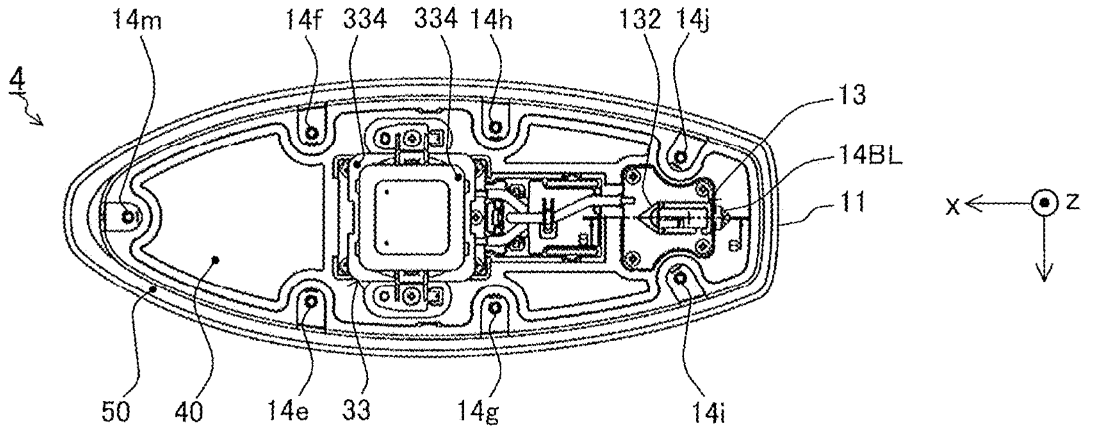
FIG. 21 is a top view of the antenna device according to the fourth embodiment.
Figure 22:
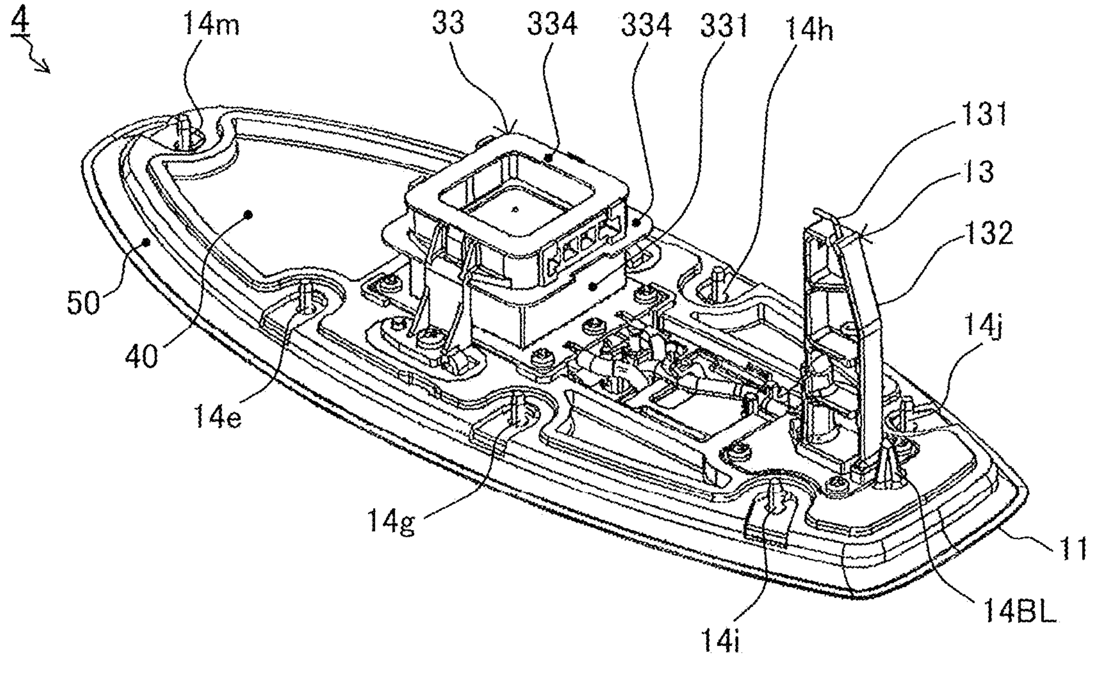
FIG. 22 is a rear perspective view of the antenna device according to the fourth embodiment.
Figure 23:
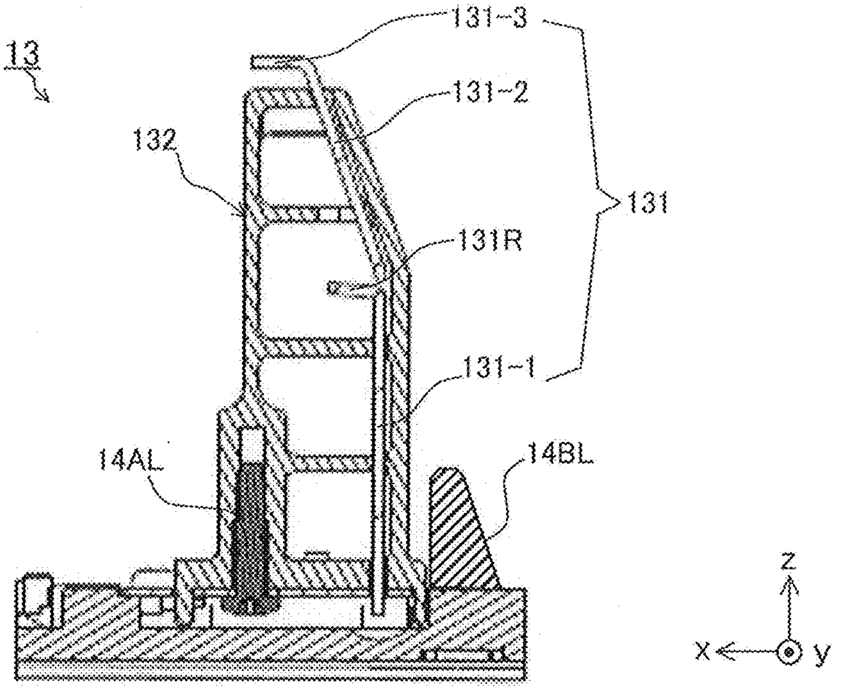
FIG. 23 is a left side view of an antenna part of the antenna device according to the fourth embodiment.

A fourth embodiment of the present invention will be described. FIG. 20 is a front perspective view of an antenna device 4 according to the fourth embodiment. FIG. 21 is a top view of an antenna device 4 according to the fourth embodiment. FIG. 22 is a rear perspective view of the antenna device 4 according to the fourth embodiment. FIG. 23 is a left side view of an antenna part of the antenna device 4 according to the fourth embodiment, specifically, a side view of the antenna 13 from the front left. In FIGS. 20 to 23, components having the same functions as those of the antenna devices 1, 2, and 3 described above are denoted by the same reference signs for convenience. Each illustrates a structural example in which the antenna case 12 illustrated in FIG. 1 is removed.

The antenna device 4 of the fourth embodiment is mainly different from the antenna devices 2 and 3 in the following configuration.

(1) The satellite-signal-compatible unit 33 is a unit for receiving signals for a High-Definition Global Navigation Satellite System, and two parasitic elements 334 each formed from a conductive plate are arranged in parallel to each other. (2) The attachment position of the base end of the radiative element 131 of the antenna 13 is shifted rearward by the length in the x-direction of the support body 132. The second linear portion 131-2 extending from the loop-shaped portion 131R of the radiative element 131 toward the tip is inclined forward relative to the first linear portion 131-1. The angle of the third linear portion 131-3 bent from the second linear portion 131-2 is larger than the angle of the third linear portion 131-3 in the antenna device 2, 3.

(3) Instead of the two conductor bars 14*a*, 14*b* on the front side of the antenna device 2, 3, on the central axis of the antenna base 11, one conductor bar 14*m* is present in front of the satellite-signal-compatible unit 33, a conductor bar 14AL is present behind the satellite-signal-compatible unit 33 and in front of the radiative element 131, and a conductor bar 14BL is present behind the antenna 13. A metal plate 40 having a ground potential is arranged between the front conductor bar 14*m* and the satellite-signal-compatible unit 33. The metal plate 40 may be integrated with the metallic base part of the antenna base 11.

According to the configuration described in the above (1), position information can be acquired with an error of 1/10 or less compared to a normal configuration for receiving satellite signal, in which the number of receivable signals is smaller. In addition, according to the configuration described in the above (2), it is possible to limit a decrease in the radiation gain of the horizontal plane. In addition, according to the configuration described in the above (3), if an antenna unit having a frequency within the V2X band as the operation frequency, such as the satellite-signal-compatible unit 33, is present in front of the antenna 13, the radiation gain in front of the antenna 13 can be reduced, and on the rear side, the radiation gain can be stably maintained high in the azimuth angle range of 60° to 300°, particularly in the range of 90° to 270°. That is, an aspect of a rear-specialized antenna 13 can be achieved.

Hereinafter, the configurations described in the above (2) and (3) will be described in detail.

For example, if the antenna device 2, 3 is to be attached to the vehicle roof, the attachment position of the vehicle roof may be largely inclined in the front-rear direction, depending on the type of the vehicle. For example, vehicles whose vehicle roof is inclined by 10° or more from the front to the rear are often seen among sedans or the like. If the antenna 13 extending in the vertical direction relative to the antenna base 11 is attached to such a vehicle as it is, the radiation gain on the horizontal plane of the antenna 13 may decrease. On the other hand, if only the antenna 13 is simply inclined in advance opposite to the inclination direction of the vehicle roof by the inclination amount of the vehicle roof while the antenna base 11 remains as it is, the polarization plane is disturbed, which disables the limitation on the decrease in the radiation gain on a horizontal plane parallel to the ground.

In the antenna device 4 of the fourth embodiment, if the attachment position of the vehicle roof is inclined rearward by θ° relative to the horizontal plane, a part of the radiative element 131 of the antenna 13, for example, the second linear portion 131-2 is inclined forward by about 2θ° relative to the first linear portion 131-1, and the third linear portion 131-3 is substantially parallel to the antenna base 11 (the configuration of the above (2)). That is, when the antenna device 4 is to be attached to such a vehicle roof, the first linear portion 131-1 and the second linear portion 131-2 of the radiative element 131 are formed in a substantially L shape that is substantially equally inclined by θ° relative to the horizontal plane. The third linear portion 131-3 has an effect of reducing the height in the z-direction of the radiative element 131 and loading a predetermined capacitance in the radiative element 131. The portion inclined from the first linear portion 131-1 toward the second linear portion 131-2 and the portion bent from the second linear portion 131-2 toward the third linear portion 131-3 may have an R shape.

By forming the radiative element 131 of the antenna 13 in such a shape, even if the vehicle roof to which the antenna device 4 is attached is inclined, the polarization plane can be corrected in the horizontal direction, thereby limiting a decrease in radiation gain in the horizontal plane of the antenna 13. In addition, the inclination θ° of the second linear portion 131-2 relative to the first linear portion 131-1 in the radiative element 131 may be allowed to be changed after attaching the antenna device 4 by forming a plurality of holes or notches for fixing the radiative element 131 in advance in each of the coupling portions of the support body 132, and selecting the holes or notches for fixing the radiative element 131 according to the vehicle type.

In the configuration of the above (3), first, the scattering in the direction of 0° forward in the V2X band can be increased by the one conductor bar 14*m*. Alternatively, a null point can be formed near 0° forward in the V2X band by the one conductor bar 14*m*. The conductor bar 14AL is operated as a reflective element of the antenna 13 in the V2X band. More specifically, as illustrated in FIG. 23, the pillar on the front is thicker than the pillar on the rear between the pair of pillars of the support body 132, and is formed into a mounting boss whose inside has a screw hole threaded. The conductor bar 14AL is screwed into the screw hole from the back side of the circuit board for V2X with the circuit board interposed therebetween, so as to join the support body 132 to the circuit board. That is, the conductor bar 14AL also serves as a joining screw between the support body 132 and the circuit board. The back side of the circuit board is formed with a conductive pattern to be electrically connected to the feed portion of the antenna 13. The conductor bar 14AL is electrically connected to the conductive pattern when the support body 132 is joined to the circuit board. Since the circuit board is fixed to the antenna base 11 by a conductor screw other than the conductor bar 14AL, the conductive pattern and the antenna base 11 are electrically connected and function as a ground conductor.

The conductor bar 14AL is arranged at a position about 12 mm away from the first linear portion 131-1 of the antenna 13 in front of the first linear portion 131-1. The distance from the ground conductor is about 12 mm, which is about ¼ λ (wavelength) in the V2X band. Therefore, the conductor bar 14AL operates as a reflective element of the antenna 13 in the V2X band. Accordingly, the directional characteristics of the antenna 13 can be directed to an azimuth angle of 60° to 300° in the y-direction (vehicle width direction) and on the rear side. In the fourth embodiment, the distance of the conductor bar 14AL from the ground conductor is set to about ¼ λ, but can be set within ¼λ to ½λ to adjust the azimuth range of radiation.

In addition, the conductor bar 14AL can be replaced with an ungrounded conductor bar to be used as a reflective element. In this case, the length of the conductor bar may be set to about ½ λ.

The conductor bar 14BL will be described. The conductor bar 14BL is arranged behind the support body 132, that is, behind the antenna 13, so as to reduce the ripple of the directional characteristics in the y-direction (the vehicle width direction) and on the rear side. The shape of the conductor bar 14BL may be a substantially conical shape, or may have another three-dimensional shape such as a quadrangular prism shape, a bar shape, a cylindrical shape, an elliptical cylindrical shape, an elongated cylindrical shape, a polygonal prism shape, a bottomed tubular shape, a cylindrical tubular shape, an elliptical tubular shape, an elongated cylindrical tubular shape, a polygonal tubular shape, an elliptical conical shape, an elongated conical shape, a polygonal pyramid shape, a surface shape, a spiral shape, or a zigzag shape. The length in the z-direction (height) of the conductor bar 14BL is about 6 mm. The distance from the radiative element 131 in the x-direction is about 6 mm.

Also in the fourth embodiment, the ripple of the directional characteristics can be reduced by adjusting the length of the conductor bar 14BL and the distance of the conductor bar 14BL from the antenna 13 (radiative element 131) as in the first to third embodiments. In addition, the radiation gain can also be increased in a desired azimuth angle range, for example, in a range of 150° to 210° on the rear side of the antenna 13 by changing the shape or the position of the conductor bar 14BL. Further, the conductor bar 14BL can also function as a waveguide element.

It can be seen that if without the conductor bar 14AL and the conductor bar 14BL (for example, if the support body 132 is simply fixed by an adhesive or the like), the level deviation of the ripple at 135° to 225° on the rear side of the antenna 13 is 3.7 dB, but if the conductor bar 14AL is added alone, the level deviation is 2.5 dB, which is reduced by 1.2 dB. The length of the conductor bar 14AL at this time was 11 mm. Further, it can be seen that if the conductor bar 14BL is added from this state, the gain on the rear side of the antenna 13 increases, and the level deviation of the ripple is also reduced. The length of the conductor bar 14BL at this time was 8 mm. Thus, it is possible to adjust the radiation gain and the level deviation on the rear side of the antenna 13 by appropriately changing the length of the conductor bar 14BL.

Figure 24:
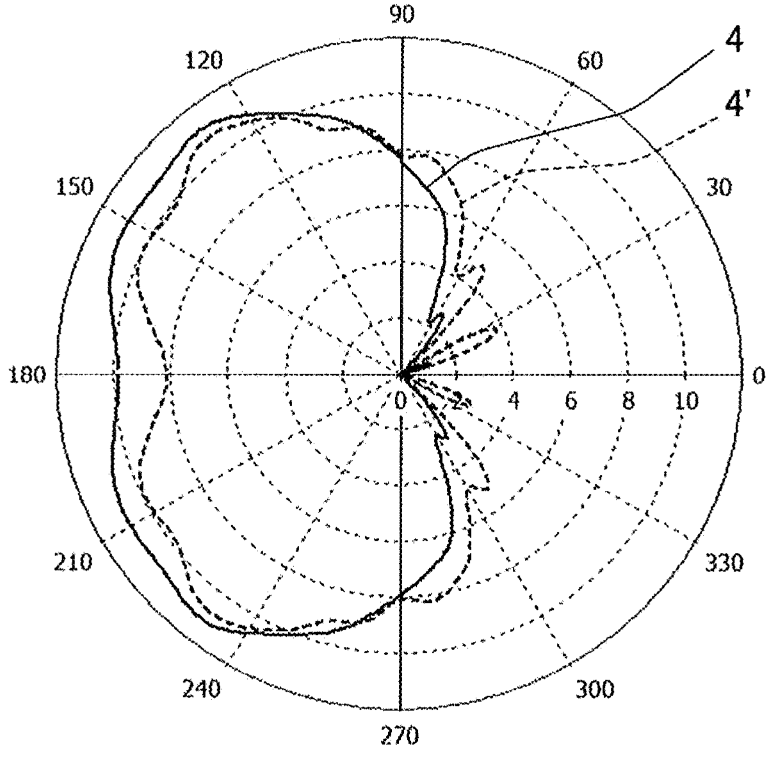
FIG. 24 is a directional characteristic diagram in a horizontal plane of the antenna device according to the fourth embodiment.

FIG. 24 illustrates the directional characteristics in a horizontal plane of the antenna device 4 of the fourth embodiment having the two conductor bars 14AL and 14BL and the comparative antenna device 4' having only the conductor bar 14AL. In the drawing, the solid line indicates the antenna device 4, and the broken line indicates the comparative antenna device 4'. In the case of the comparative antenna device 4', the radiation gain of the antenna 13 at 180° on the rear side is 8.2 dB, whereas in the case of the antenna device 4, the radiation gain of the antenna 13 at 180° on the rear side is 9.9 dB. Accordingly, the radiation gain of the antenna 13 was improved by about 1.7 dB by simply adding the conductor bar 14BL. Further, in the case of the comparative antenna device 4', the level deviation in the range of 135° to 225° on the rear side of the antenna 13 is 2.5 dB, whereas the level deviation of the antenna device 4 is 1.3 dB. Accordingly, the level deviation was reduced and the ripple of the directional characteristics was also reduced by simply adding the conductor bar 14BL.

In this example, the distance in the x-direction from the center of the length in the z-direction of the conductor bar 14AL to the radiative element 131 of the antenna 13 is 11.9 mm, and the distance in the x-direction from the center of the length in the z-direction (height) of the conductor bar 14BL to the radiative element 131 of the antenna 13 is 6.2 mm. However, the distance may be set to any value to adjust the radiation gain such that the desired directional characteristics can be obtained.

In the above description, the length and the position of the conductor bar 14BL are set to reduce the ripple. On the other hand, in order to change the directional characteristics later, the length and the position of the conductor bar 14BL may be set to increase the ripple at the position.

The structure of the portion of the antenna case 12 for fixing the joining screws (conductor bars 14*c* to 14*j*) will be described in detail. Mounting bosses (resin) for mounting the joining screws on the antenna case 12 are provided as described in the second embodiment. To waterproof the inside of the antenna case 12, the periphery of the mounting boss is provided with a rib-shaped pad 50 for sandwiching the antenna base 11 and the antenna case 12. Here, the pad 50 is made of resin and has elasticity.

The rib-shaped structure of the mounting boss and the pad 50 may affect the scattering mode due to the conductor bars 14*i*, 14*j* near the antenna 13. That is, different from the scattering mode of the conductor bars 14*i*, 14*j* alone, it is desirable to set the lengths and positions of the conductor bars 14*i*, 14*j* in consideration of the effect of these structures. For example, if the presence of the conductor bars 14*i*, 14*j* has a larger effect on the directional characteristics, the directional characteristics can be adjusted by making the effect of scattering by the conductor bar 14AL more dominant than the effect of scattering by the conductor bars 14*i*, 14*j* by arranging the conductor bars 14*i*, 14*j* close to the radiative element 131 like the conductor bar 14AL.

As described above, in the fourth embodiment, an example of an antenna device 4 covering the range of 60° to 300° on the rear and in the width direction (y-direction) of the mounted vehicle has been described, whereas the range from 0° to 60° and from 300° to 0° on the front of the vehicle may be covered by another V2X antenna installed on the windshield of the vehicle, for example. That is, the entire periphery of the vehicle may be covered by a V2X antenna other than the antenna 13 of the fourth embodiment.

Fifth Embodiment

Figure 25:
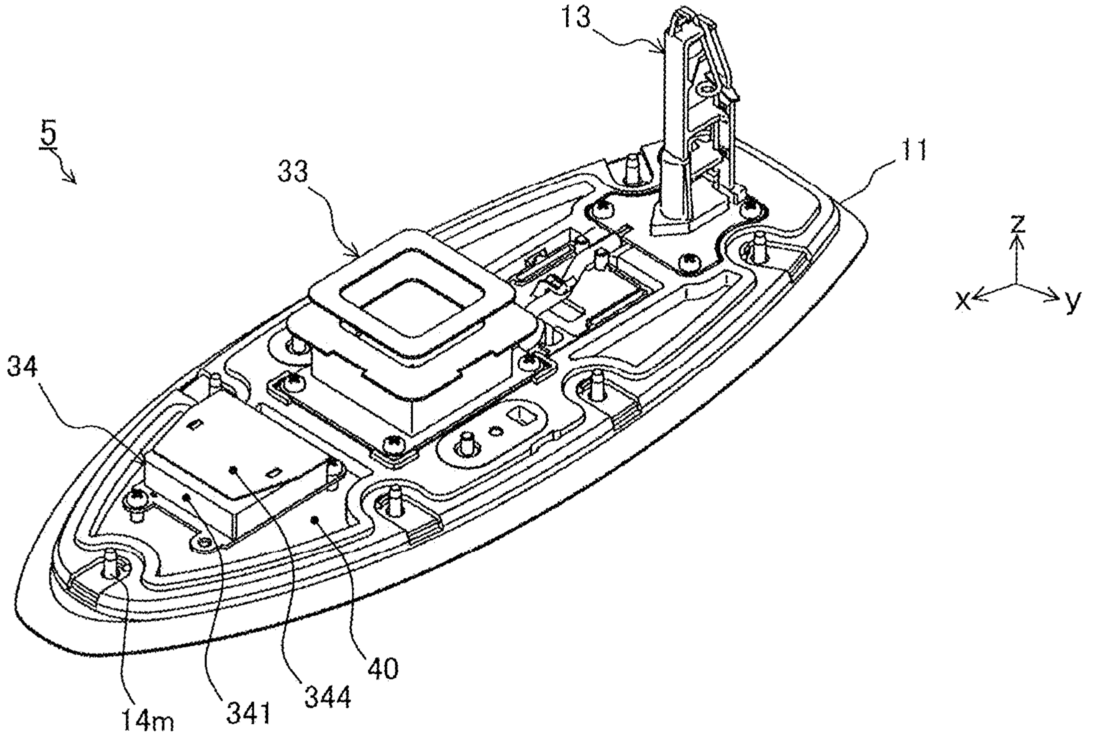
FIG. 25 is a front perspective view of an antenna device according to a fifth embodiment.
Figure 26:
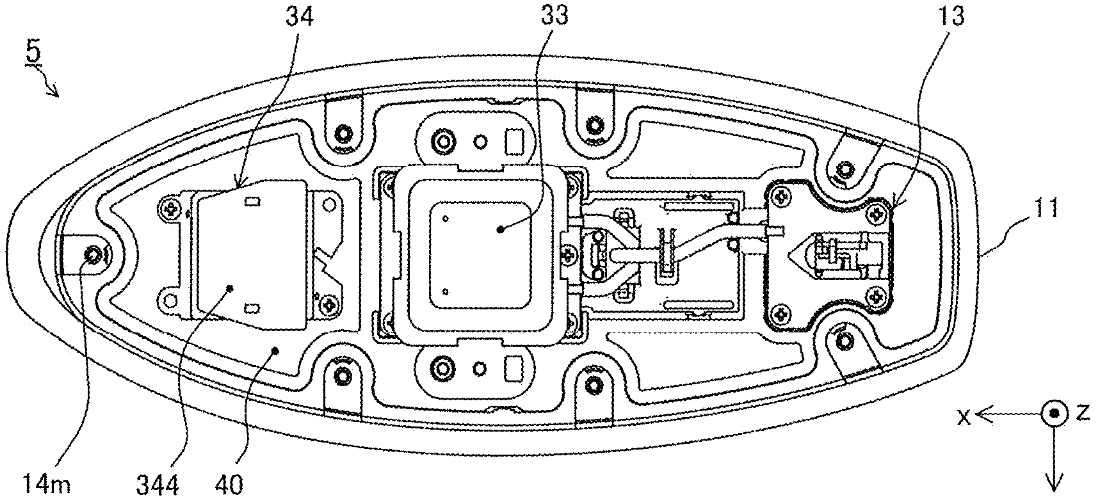
FIG. 26 is a top view of the antenna device according to the fifth embodiment.
Figure 27:
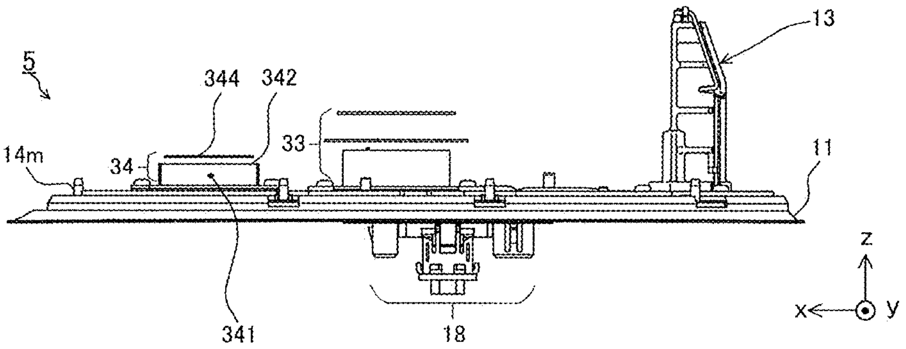
FIG. 27 is a left side view of the antenna device according to the fifth embodiment.

A fifth embodiment of the present invention will be described. FIG. 25 is a front perspective view of an antenna device 5 according to the fifth embodiment. FIG. 26 is a top view of the antenna device 5 according to the fifth embodiment. FIG. 27 is a side view of the antenna device 5 according to the fifth embodiment as viewed from the front left. In FIGS. 25 to 27, functional components similar to those of the antenna device 4 of the fourth embodiment are denoted by the same reference signs, and redundant description thereof is omitted. For example, the satellite-signal-compatible unit 33 has two parasitic elements, and the parasitic elements have a shape in which only the center is hollowed out.

Each drawing illustrates a structural example in which the antenna case 12 illustrated in FIG. 1 is removed.

The antenna device 5 according to the fifth embodiment differs from the antenna device 4 according to the fourth embodiment in that an SXM (SiriusXM digital radio)-compatible unit 34 is present on the surface of the metal plate 40 that is in front of the satellite-signal-compatible unit 33 and behind the conductor bar 14*m*.

The SXM-compatible unit 34 includes a base 341 made of ceramic or the like and fixed to a substrate, a patch antenna 342 provided on the surface in the z-direction of the base 341, and a conductive parasitic element 344. The SXM-compatible unit 34 is arranged at a position where the effect of the scattered waves on the signals transmitted and received by the antenna 13 is reduced. An antenna attachment portion 18 is fixed to the back side of the antenna base 11, that is, the side facing the vehicle roof when the antenna device 5 is attached.

In the example of FIGS. 25 to 27, the conductor bar 14BL of the antenna device 4 according to the fourth embodiment is absent, but the antenna device 5 may include the conductor bar 14BL.

Other Embodiments

Figure 28:
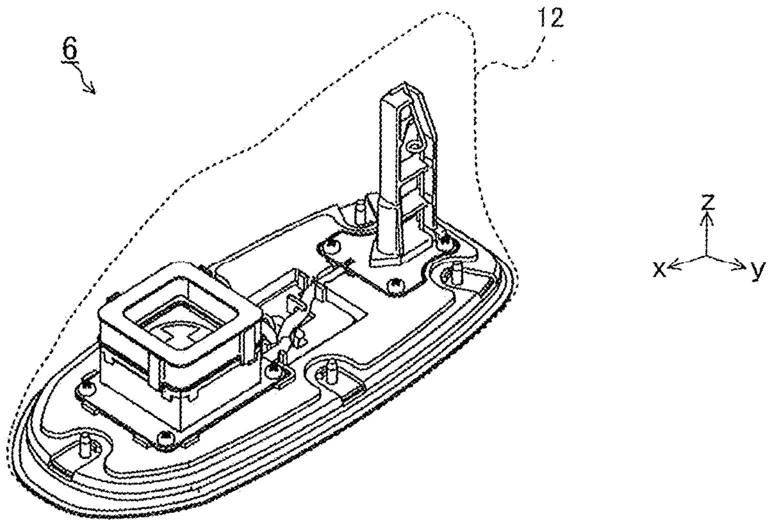
FIG. 28 is a perspective view of an antenna device according to another embodiment.
Figure 29:
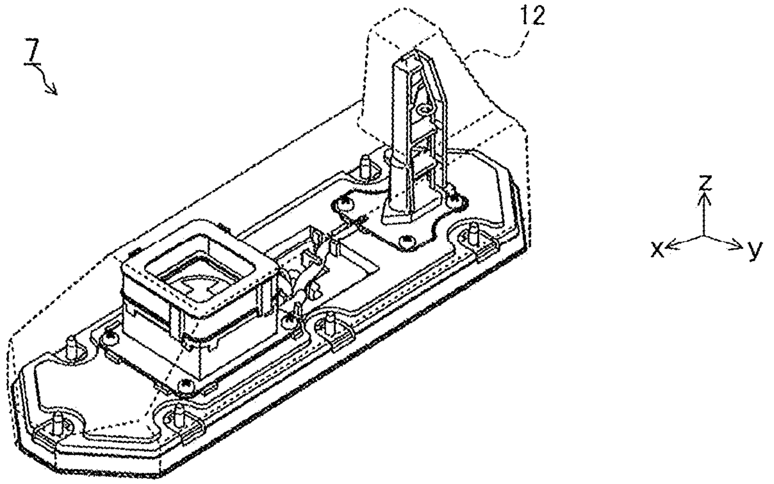
FIG. 29 is a perspective view of an antenna device according to another embodiment.
Figure 30:
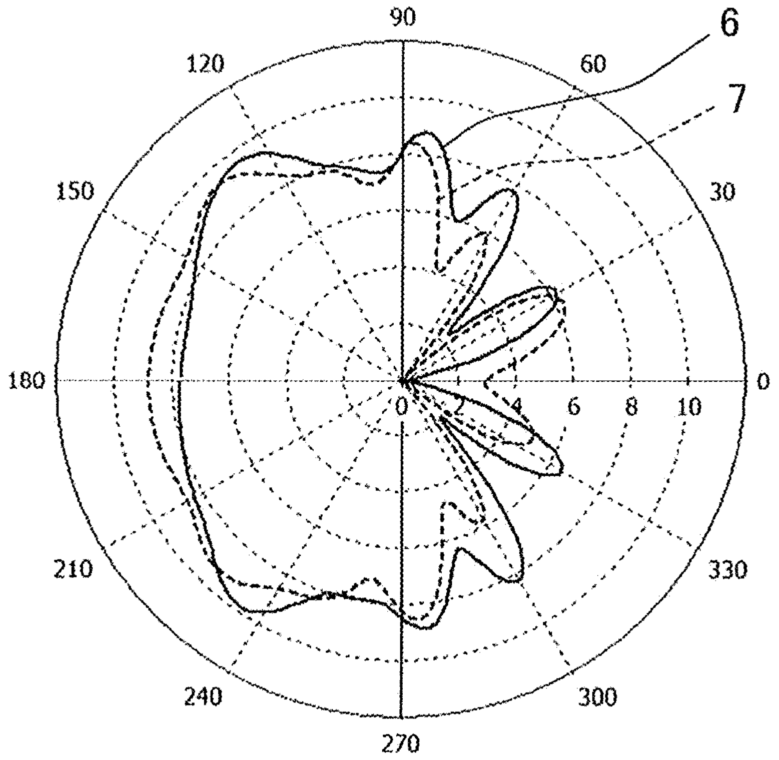
FIG. 30 is a directional characteristic diagram in a horizontal plane of the antenna device according to the other embodiment.

The description of the shape and structure of the antenna case 12 is omitted in the fourth embodiment, but the case design including the antenna case 12 may affect the directional characteristics of the antenna 13. For example, FIG. 28 illustrates an antenna device 6 of a first case design (an antenna case 12 in the shape of a shark-fin), and FIG. 29 illustrates an antenna device 7 of a second case design (an antenna case 12 in the shape of a rocket). The antenna structures in the cases of the antenna devices 6 and 7 are the same as those in the fourth embodiment. FIG. 30 is a directional characteristic diagram in a horizontal plane of the antenna devices 6 and 7.

As described above, the adjustment of the radiation gain of the antenna 13 and the level deviation of the ripple may change from the design values due to the difference in the case design, but can be corrected according to the design values by applying the technique of the fourth embodiment to arrange the conductor bars 14*m*, 14*c* to 14*i*, 14AL, 14BL, and the like in appropriate sizes at appropriate positions.

The examples of the antenna devices 1 to 7 mounted on a vehicle have been described in the plurality of embodiments, whereas the present invention can also be implemented as an antenna device for another movable body in which the antenna accommodated in the antenna housing is desired to be isotropic, such as a drone or a robot.

In the above-described embodiment, the conductor bars may be fixed or may be configured to be detachable. If the conductor bars are configured to be detachable, the conductor bars can be attached or detached to be adjusted to desired directional characteristics, which can enhance the degree of freedom of design. Moreover, if the conductor bars are configured to be detachable, it is not necessary to use a dedicated antenna base, which enables the compatibility with various antenna bases, and further limits the cost and enhances the degree of freedom of design. Further, the employment of detachable conductor bars can prevent the conductor bars from being arranged at unnecessary positions, which limits the cost.

According to the disclosure of the present specification, for example, the antenna devices of the following aspects are provided.

Aspect 1

An antenna device according to Aspect 1 includes: an antenna housing in which a hollow portion is formed; an antenna located inside the antenna housing and configured to perform at least one of transmission and reception of electric waves; and a scatterer configured to scatter the electric waves propagating through the hollow portion at a predetermined position of the antenna housing.

The scatterer is, for example, a passive member that receives an action of external electric waves or the like and scatters the electric waves.

According to the above aspect, the scatterer scatters the electric waves propagating through the hollow portion of the antenna housing. This can reduce the ripple of the directional characteristics at the time of transmission or reception. In particular, the effect of the null points having the minimum value of the ripple can be relaxed. In addition, the directional characteristics of the scatterer can be changed freely.

Aspect 2

In Aspect 2, at least one scatterer is present in a position where a ripple of directional characteristics of the electric waves is smaller than in other positions. Alternatively, the number of the scatterer is two or more, at least one first scatterer is located at the predetermined position in the antenna housing, and at least one second scatterer is located at a position where a deviation of an intensity distribution of the electric waves in the vicinity of the predetermined position is relatively small. Alternatively, the number of the scatterer is two or more, at least one first scatterer is located at the predetermined position in the antenna housing, and at least one second scatterer is located at a position where a ripple of directional characteristics occurs. Alternatively, two or more scatterers are present at positions substantially symmetrical with respect to an axis connecting a feed point of the antenna and a geometric center of the antenna housing. Alternatively, the scatterer is present on an axis connecting a feed point of the antenna and a geometric center of the antenna housing.

According to the above aspect, the ripple in the directional characteristics of the antenna is relaxed. Therefore, the directional characteristics of the antenna of the antenna housing can be close to isotropic.

Aspect 3

In Aspect 3, the scatterer is configured with an ungrounded conductive component. Alternatively, the scatterer is configured with a grounded conductive component. Alternatively, the scatterer is configured with a non-conductive component. Alternatively, the antenna is an isotropic element extending vertically from a ground surface, and the scatterer is arranged parallel to the antenna with a length of 0.1 to 1 times a wavelength λ of an operation frequency of the antenna.

According to the above aspect, it is possible to change the size and arrangement mode of the scatterer according to the structure of the antenna device. Therefore, the degree of freedom in designing the antenna device can be enhanced.

Aspect 4

Aspect 4 includes: an antenna housing in which a hollow portion is formed; an antenna located inside the antenna housing and configured to perform at least one of transmission and reception of electric waves; and a scatterer configured to scatter the electric waves propagating through the hollow portion at a predetermined position of the antenna housing, in which the antenna housing has an antenna base and an antenna case that forms the hollow portion on the antenna base, the number of the scatterer is two or more, and the scatterers are present at a position in which an intensity of the propagating electric waves are relatively small among the antenna base and the antenna case.

According to the above aspect, the scatterer scatters the electric waves propagating through the hollow portion of the antenna housing. This can reduce the ripple of the directional characteristics at the time of transmission or reception. In addition, the directional characteristics of the scatterer can be changed freely.

In the related art, for example, in the case of V2V communication, which is an example of V2X, the front and the rear each require one antenna having directional characteristics. However, the scatterer can enhance, for example, the intensity of electric waves in the front-rear directions with one antenna, so that one antenna is sufficient. In addition, the scatterer can also change the directional characteristics not only in the front-rear direction but also in the left-right direction. This can reduce the size and cost of the antenna device.

Aspect 5

In Aspect 5, the scatterer is detachably attached to the antenna base or the antenna case. Alternatively, the antenna base is formed with a resin mounting boss capable of adjusting an insertion amount of the scatterer. Alternatively, a joining tool for joining the antenna base and the antenna base also serves as the scatterer.

According to the above aspect, it is possible to change the size and arrangement mode of the scatterer according to the structure of the antenna device. Therefore, the degree of freedom in designing the antenna device can be enhanced.

Aspect 6

In Aspect 6, an antenna component other than the antenna is present in the hollow portion, and a joining tool for joining the antenna component to the antenna housing also serves as the scatterer.

According to the above aspect, if an antenna component is provided on the antenna housing, the joining tool functions as the scatterer, so that it is not necessary to separately provide a scatterer.

Aspect 7

In Aspect 7, the antenna is a V2X antenna, and one of the antenna components is a satellite-signal-compatible unit. Alternatively, the satellite-signal-compatible unit has a patch electrode whose height from the attachment position is lower than that of the antenna. Alternatively, the satellite-signal-compatible unit is provided with a parasitic element that covers the patch electrode in a non-contact manner. Alternatively, the parasitic element has a waveguide function for the patch electrode.

According to the above aspect, the ripple can be easily relaxed even if both the V2X antenna and the satellite-signal-compatible unit are mixed in the antenna housing.

Aspect 8

In Aspect 8, a part of the radiative element of the antenna is inclined in a predetermined direction, for example, in a direction opposite to an inclination angle when the attachment position is inclined. The inclination angle of the part of the radiative element may be about twice the inclination angle of the attachment position.

According to the above aspect, it is possible to limit a decrease in the gain in a horizontal plane of the radiative element due to the inclination of the attachment position.

Aspect 9

In Aspect 9, a conductor bar functioning as a reflective element is present in front of the antenna, and another conductor bar serving as a scatterer is present behind the antenna.

According to the above aspect, the directional characteristics of the antenna can be changed later. Further, the level deviation of the ripple can be reduced.

REFERENCE SIGNS LIST

1, 2, 3, 4, 5, 6, 7 antenna device
10 antenna housing
11 antenna base
12 antenna case
13 antenna
131 radiative element
132 support body
14, 14*a* to 14*j*, 14*m*, 14AL, 14BL conductor bar
33 satellite-signal-compatible unit
331 dielectric
332 electrode
334 parasitic element
34 SXM-compatible unit
341 base
342 patch antenna
344 parasitic element

The invention claimed is:

1. An antenna device comprising:
an antenna housing in which a hollow portion is formed;
an antenna located inside the antenna housing and configured to perform at least one of transmission and reception of electric waves; and
a scatterer configured to scatter the electric waves propagating through the hollow portion at a predetermined position of the antenna housing,
wherein at least one scatterer is present in a position in the antenna housing where a ripple of directional characteristics of the electric waves is smaller than in all other positions in the antenna housing.

2. The antenna device according to claim 1, wherein
a number of the scatterer is two or more,
at least one first scatterer is located at the predetermined position in the antenna housing, and
at least one second scatterer is located at a position in the antenna housing where a deviation of an intensity distribution of the electric waves in a vicinity of the predetermined position is relatively small.

3. The antenna device according to claim 1, wherein
a number of the scatterer is two or more,
at least one first scatterer is located at the predetermined position in the antenna housing, and
at least one second scatterer is located at a position in the antenna housing where a ripple of directional characteristics is relatively small.

4. The antenna device according to claim 1, wherein
two or more scatterers are present at positions substantially symmetrical with respect to an axis connecting a feed point of the antenna and a geometric center of the antenna housing.

5. The antenna device according to claim 1, wherein
the scatterer is present on an axis connecting a feed point of the antenna and a geometric center of the antenna housing.

6. The antenna device according to claim 1, wherein
the scatterer is configured with an ungrounded conductive component.

7. The antenna device according to claim 1, wherein
the scatterer is configured with a grounded conductive component.

8. The antenna device according to claim 1, wherein
the scatterer is configured with a non-conductive component.

9. The antenna device according to claim 1, wherein
the antenna is a resonant element extending vertically from a ground surface, and
the scatterer is arranged parallel to the antenna with a length of 0.1 to 1 times a wavelength $\lambda$ of an operation frequency of the antenna.

* * * * *